(12) United States Patent
Palmaro

(10) Patent No.: US 10,067,636 B2
(45) Date of Patent: Sep. 4, 2018

(54) SYSTEMS AND METHODS FOR A VIRTUAL REALITY EDITOR

(71) Applicant: Unity IPR ApS, Copenhagen K (DK)

(72) Inventor: Gregory Lionel Xavier Jean Palmaro, Paris (FR)

(73) Assignee: Unity IPR ApS, Copenhagen (DK)

(*) Notice: Subject to any disclaimer, the term of this patent is extended or adjusted under 35 U.S.C. 154(b) by 69 days.

(21) Appl. No.: 15/428,966

(22) Filed: Feb. 9, 2017

(65) Prior Publication Data
US 2017/0228130 A1    Aug. 10, 2017

Related U.S. Application Data

(60) Provisional application No. 62/363,004, filed on Jul. 15, 2016, provisional application No. 62/293,131, filed on Feb. 9, 2016.

(51) Int. Cl.
| | |
|---|---|
| G06F 3/048 | (2013.01) |
| G06F 3/0481 | (2013.01) |
| G06F 3/01 | (2006.01) |
| G06F 3/0482 | (2013.01) |
| G06F 3/0485 | (2013.01) |
| G06T 19/20 | (2011.01) |
| G06T 19/00 | (2011.01) |

(52) U.S. Cl.
CPC .......... *G06F 3/04815* (2013.01); *G06F 3/011* (2013.01); *G06F 3/017* (2013.01); *G06F 3/0482* (2013.01); *G06F 3/0485* (2013.01); *G06T 19/006* (2013.01); *G06T 19/20* (2013.01)

(58) Field of Classification Search
None
See application file for complete search history.

(56) References Cited

U.S. PATENT DOCUMENTS

| | | | |
|---|---|---|---|
| 9,448,687 B1* | 9/2016 | McKenzie | G06F 3/011 |
| 9,524,482 B2* | 12/2016 | Yopp | G06Q 10/067 |
| 9,633,477 B2* | 4/2017 | Park | G06T 19/006 |
| 2012/0249741 A1* | 10/2012 | MacIocci | G06F 3/011 |
| | | | 348/46 |
| 2013/0194175 A1* | 8/2013 | Tarama | G06F 3/005 |
| | | | 345/156 |

(Continued)

*Primary Examiner* — Hua Lu
(74) *Attorney, Agent, or Firm* — Schwegman Lundberg & Woessner, P.A.

(57) ABSTRACT

A system includes processors, a head mounted display, a hand-tracking input device, and an editor engine. The editor engine performs operations including identifying a set of virtual assets, each virtual asset includes data associated with a 3D object, creating a card tray within a virtual environment, creating one or more virtual cards within the card tray, the one or more virtual cards including a first virtual card, the first virtual card is configured with a first interaction mechanic including a triggering gesture and an associated gesture response, the triggering gesture allows the user to interact with the first virtual card within the virtual environment by performing the triggering gesture, detecting performance of the triggering gesture by the user on the first virtual card using the first hand-tracking input device, and based on detecting performance of the triggering gesture, performing the gesture response associated with the first interaction mechanic.

24 Claims, 27 Drawing Sheets

(56) References Cited

U.S. PATENT DOCUMENTS

| | | | |
|---|---|---|---|
| 2014/0168062 A1* | 6/2014 | Katz | G06F 3/017 |
| | | | 345/156 |
| 2014/0282224 A1* | 9/2014 | Pedley | G06F 3/017 |
| | | | 715/784 |
| 2015/0062165 A1* | 3/2015 | Saito | G02B 27/017 |
| | | | 345/633 |
| 2015/0124086 A1* | 5/2015 | Melle | G01B 11/002 |
| | | | 348/136 |
| 2015/0169176 A1* | 6/2015 | Cohen | G06F 3/04815 |
| | | | 715/852 |
| 2015/0286391 A1* | 10/2015 | Jacobs | G06F 1/163 |
| | | | 715/771 |
| 2015/0317365 A1* | 11/2015 | Andress | G06F 17/2247 |
| | | | 707/722 |
| 2016/0044298 A1* | 2/2016 | Holz | H04N 13/0257 |
| | | | 348/47 |
| 2016/0062616 A1* | 3/2016 | Lee | G06F 3/04845 |
| | | | 715/766 |
| 2016/0129346 A1* | 5/2016 | Mikhailov | A63F 13/5255 |
| | | | 463/33 |
| 2016/0132567 A1* | 5/2016 | Dole | G06F 17/30554 |
| | | | 707/722 |
| 2016/0239080 A1* | 8/2016 | Marcolina | G06F 3/011 |
| 2016/0378204 A1* | 12/2016 | Chen | G01C 3/08 |
| | | | 345/156 |
| 2016/0378294 A1* | 12/2016 | Wright | G06F 3/04815 |
| | | | 715/851 |

* cited by examiner

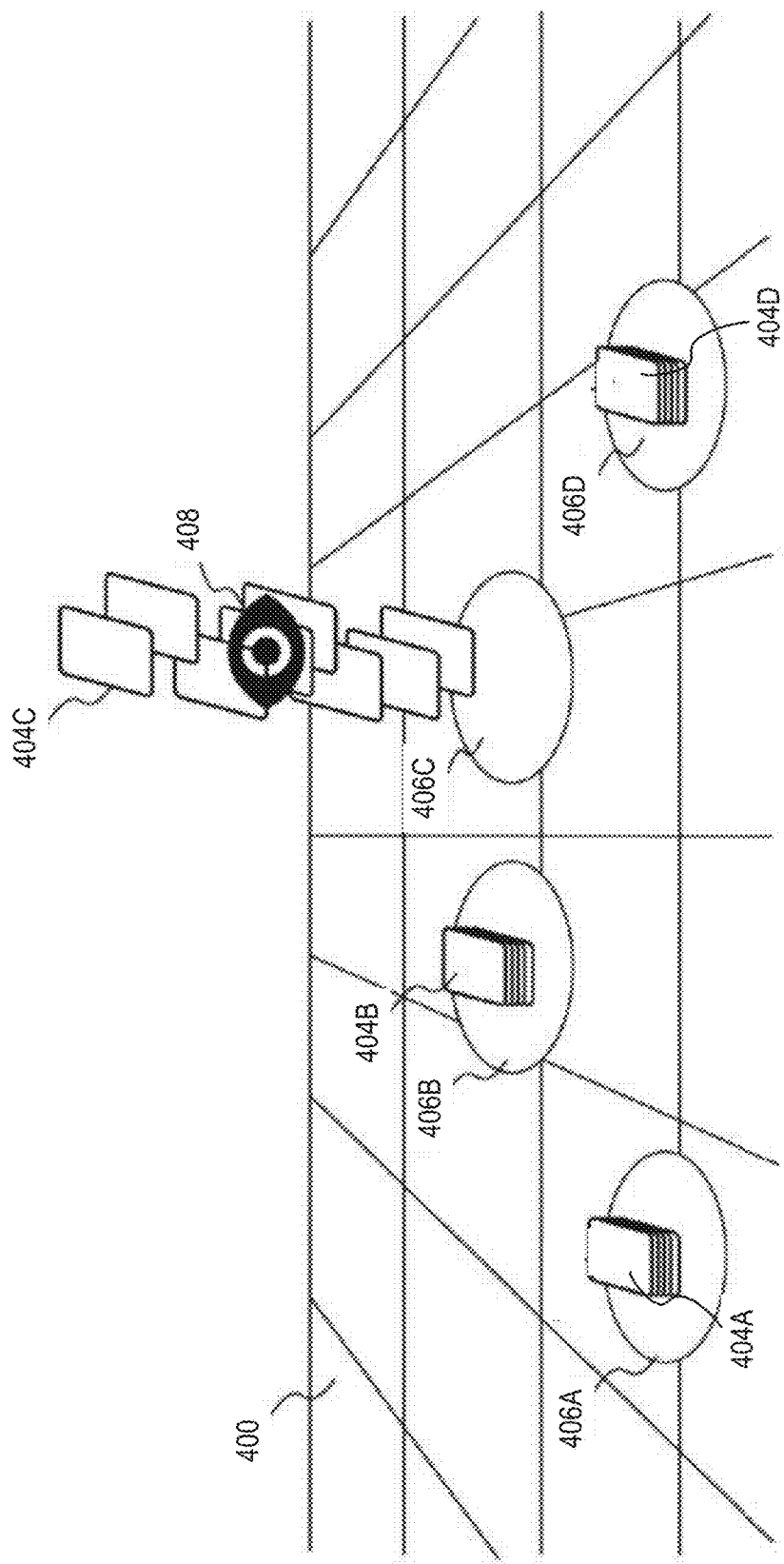

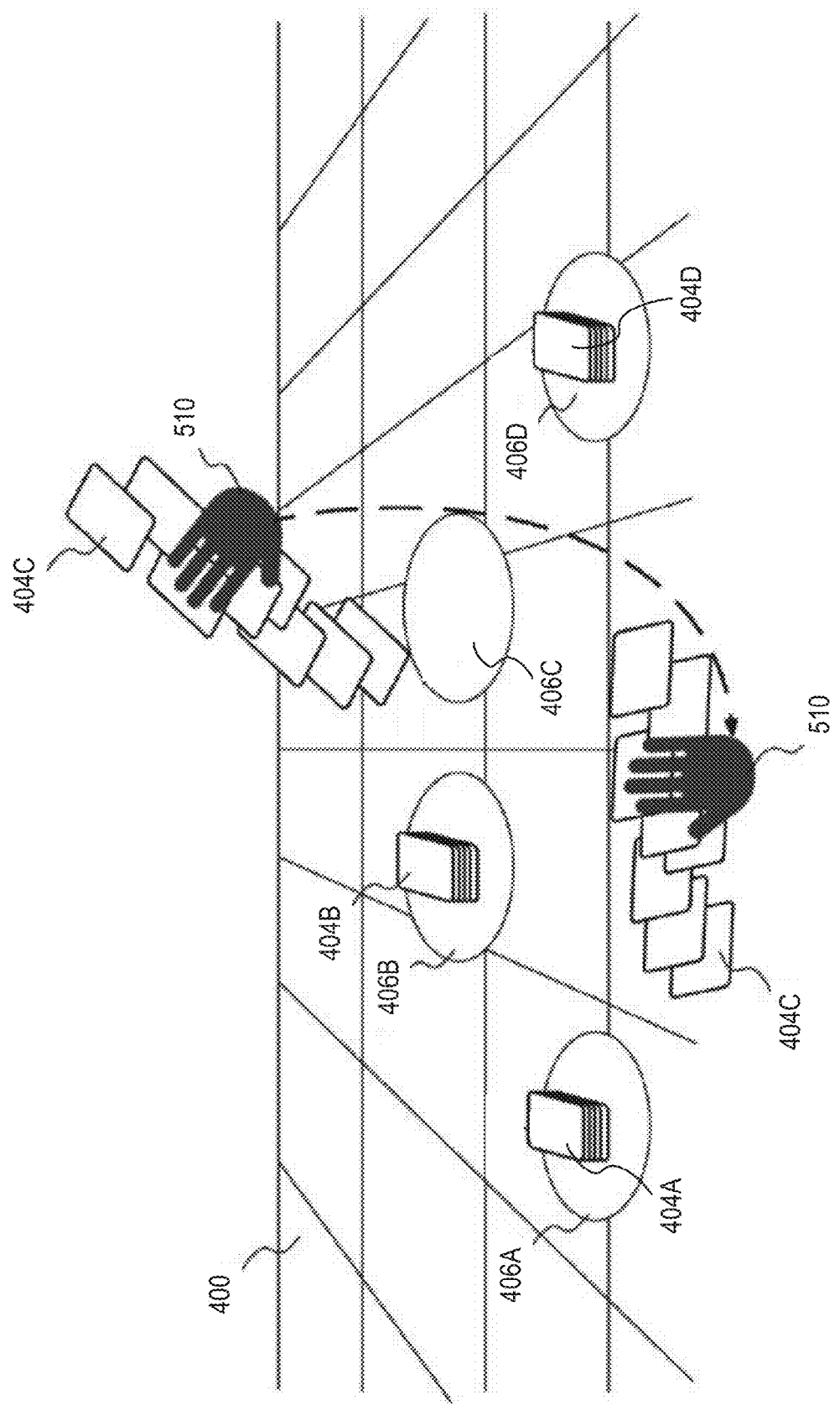

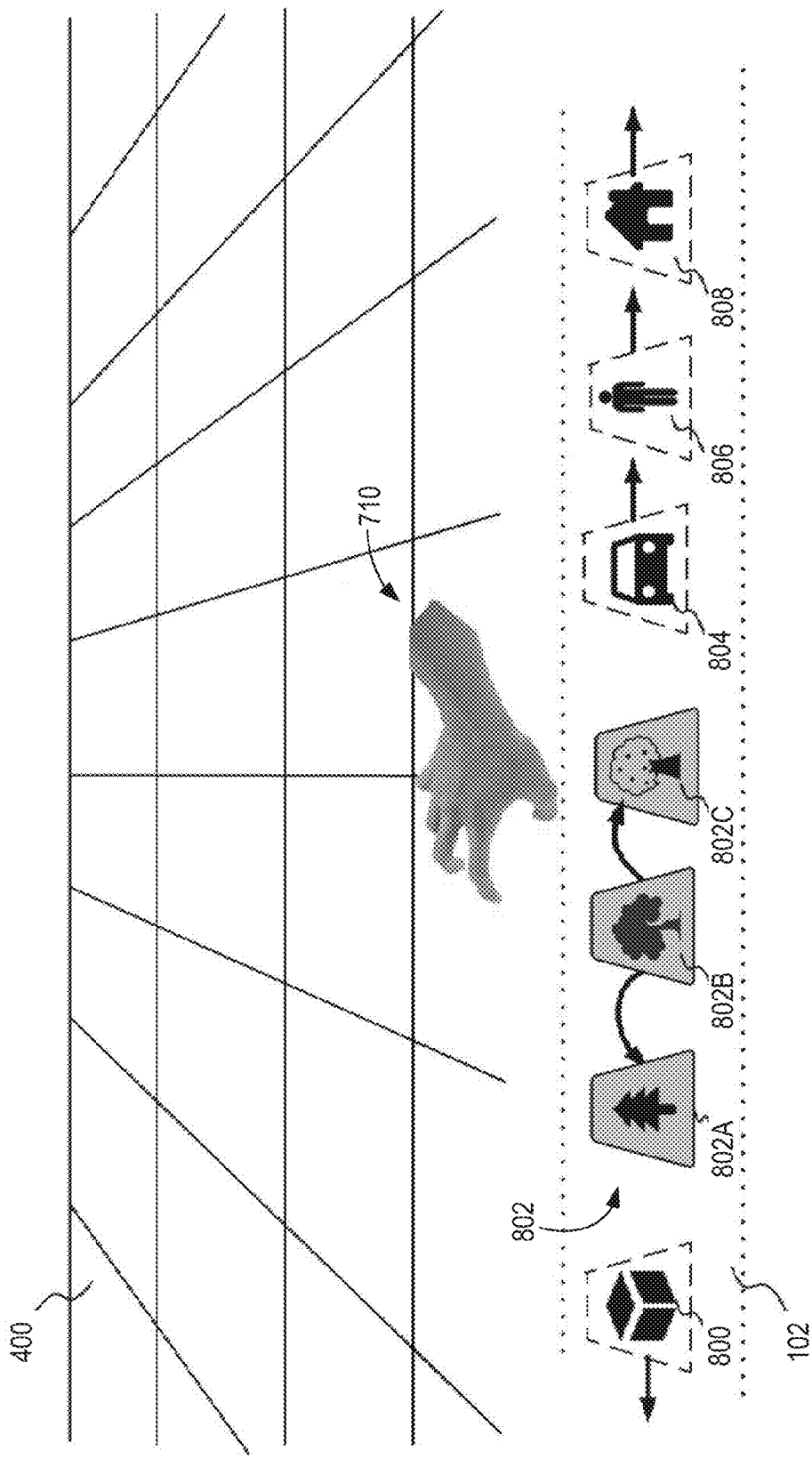

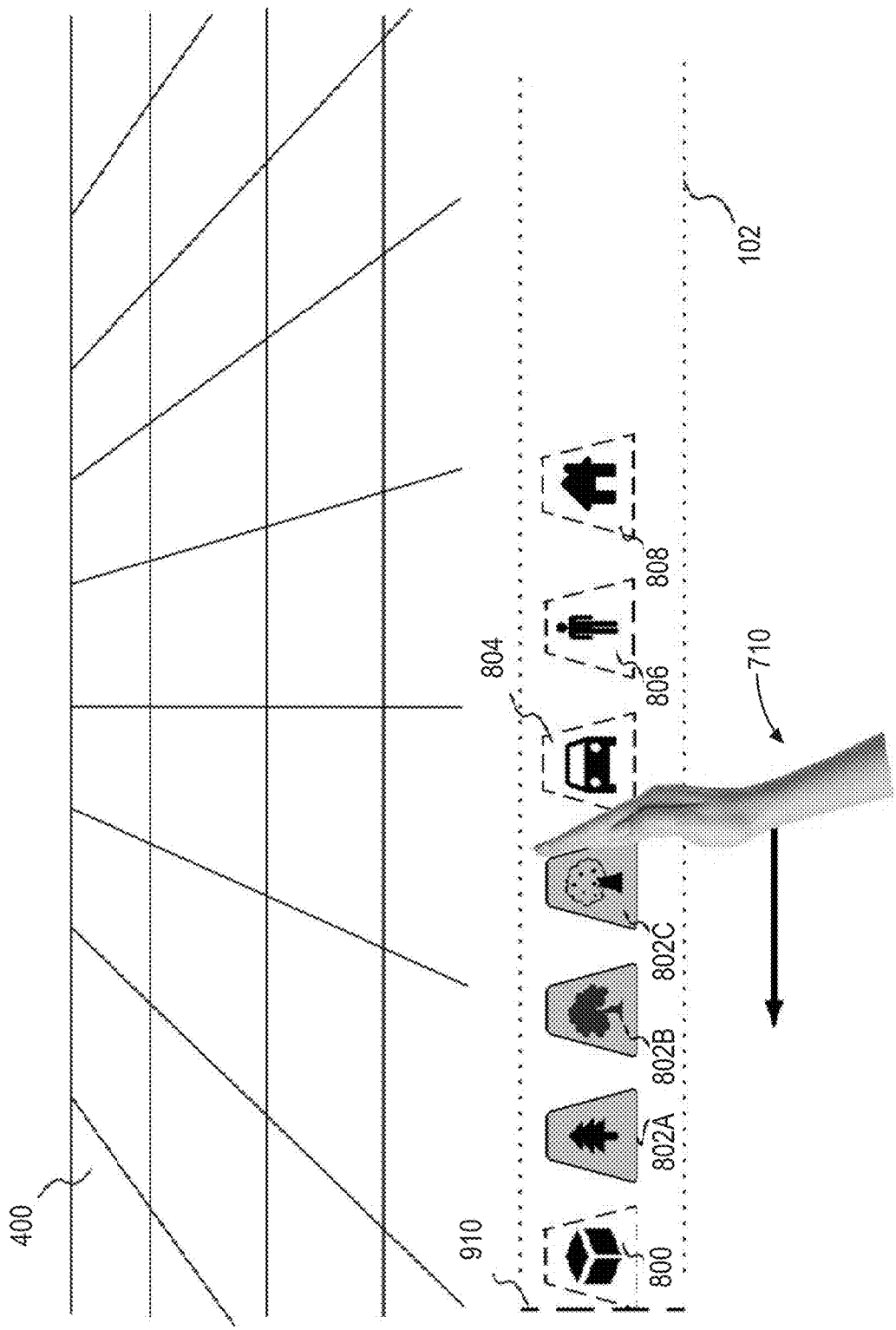

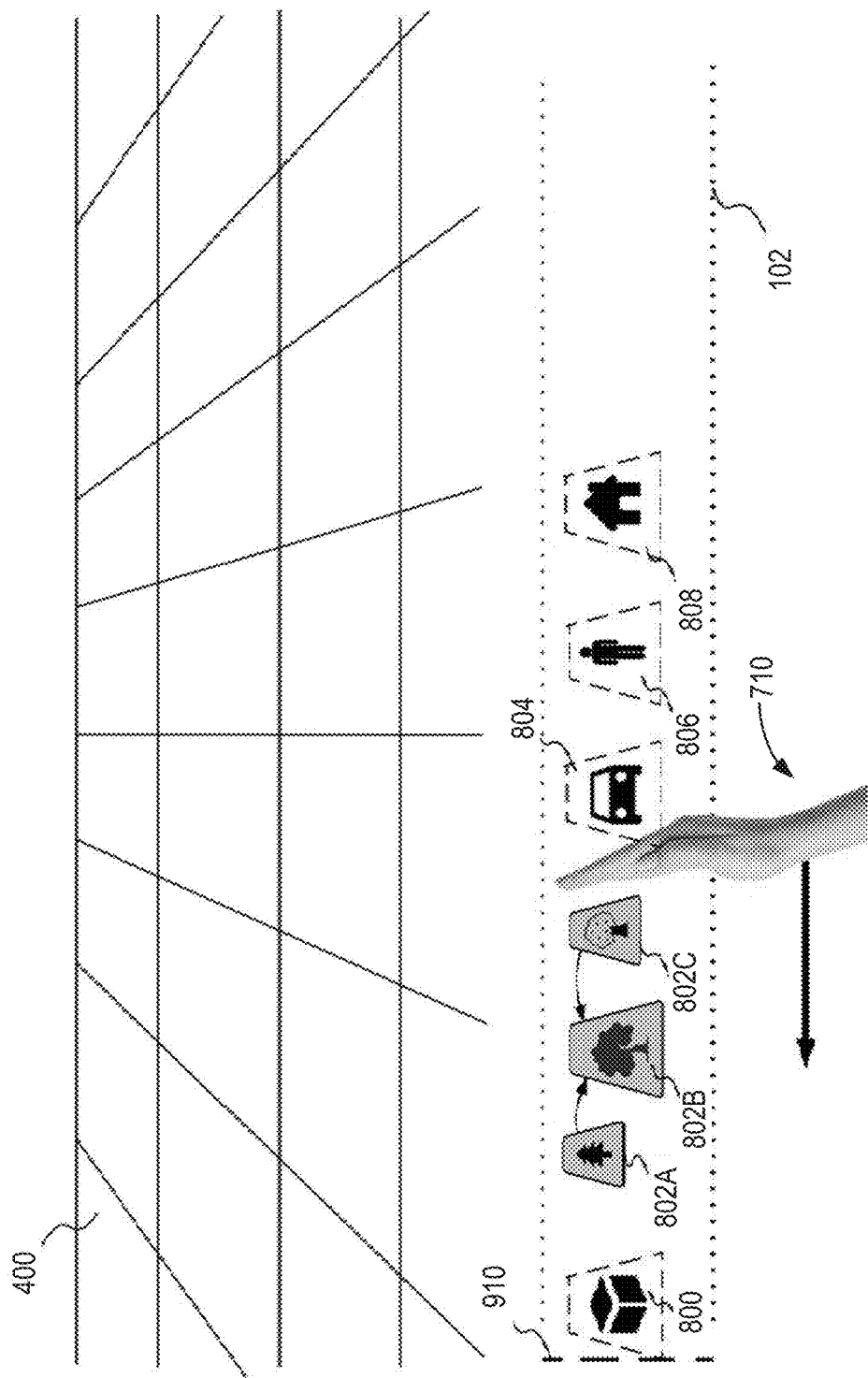

US 10,067,636 B2

SYSTEMS AND METHODS FOR A VIRTUAL REALITY EDITOR

RELATED APPLICATIONS

This application claims the benefit of priority to U.S. Provisional Patent Application Ser. No. 62/293,131, filed Feb. 9, 2016, and U.S. Provisional Patent Application Ser. No. 62/363,004, filed Jul. 15, 2016, both of which are herein incorporated by reference in their entireties.

TECHNICAL FIELD

The present disclosure relates to the field of virtual reality and, in some embodiments, to software tools for the creation and manipulation of virtual reality objects in a virtual reality environment.

BACKGROUND

Traditionally, virtual objects used in virtual reality environments are created in 2-dimensional (2D) or 3-dimensional (3D) environments on a standard computer (e.g. desktop or laptop). The objects are created in traditional 3D graphics computer software using traditional user input devices such as keyboards, computer mice and finger pads. These virtual objects (and collectively the virtual environments that they create) are then transferred to a virtual reality environment to be experienced by a user (e.g. via a head mounted virtual reality display system). As such, there is a disconnect between the creation of a virtual object and the experiencing of that object, making it more difficult to create compelling virtual reality experiences. What is needed are tools to create virtual objects (and environments) directly within a virtual reality session (e.g. when using a head mounted virtual reality headset).

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Various ones of the appended drawings merely illustrate example embodiments of the present disclosure and cannot be considered as limiting its scope.

FIGS. 4A and 4B illustrate user-perspective views of a deck inspection process in a VR environment for selecting the set of cards that are used to populate the tray;

FIGS. 5A and 5B illustrate user-perspective views of a deck selection process in the VR environment in which the user selects the deck of cards used to populate the tray;

FIGS. 8A and 8B illustrate user-perspective views of example operations in which the virtual hand interacts with the card tray in the palm down orientation;

FIGS. 9A, 9B, 9C and 9D illustrate user-perspective views of example operations in which the virtual hand interacts with the card tray in the palm down orientation;

The headings provided herein are merely for convenience and do not necessarily affect the scope or meaning of the terms used. Like numbers in the Figures indicate like components.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

The following description and drawings are illustrative of the disclosure and are not to be construed as limiting the disclosure. Numerous specific details are described to provide a thorough understanding of the present disclosure. However, in certain instances, details well known to those in the art may not be described in order to avoid obscuring the description of the present disclosure.

Methods and apparatuses to create and manipulate virtual objects directly in a virtualized 3D environment (e.g., virtual reality (VR) or augmented reality (AR)) are described here. There are many different embodiments which are described here. Some of these embodiments are summarized in this section.

In accordance with an embodiment, there is provided a virtual reality (VR) editor engine for creating and manipulating 3D virtual objects directly within a virtualized 3D environment (e.g., via a VR or AR head mounted display, and optionally using hand tracking devices or controllers). The VR editor engine presents a series of cards in a floating virtual tray, and alongside the virtual environment. Each card within the tray is linked with a 3D virtual asset from an asset store. When a card is selected by the user and is placed in the virtual environment (e.g., through interaction with the virtual tray using the hand tracking device), the 3D virtual asset represented by the card is created in the virtual environment at the location where the card was placed.

Many of the embodiments are described herein within a VR environment (e.g., a full virtualized environment, where the wearer of the head-mounted display sees only what the display provides). However, it should be understood that many of these embodiments may also be performed within an AR environment (e.g., a partial virtualized environment, where the wearer of the head-mounted display sees a real-world view augmented by additional content).

Figure 1:
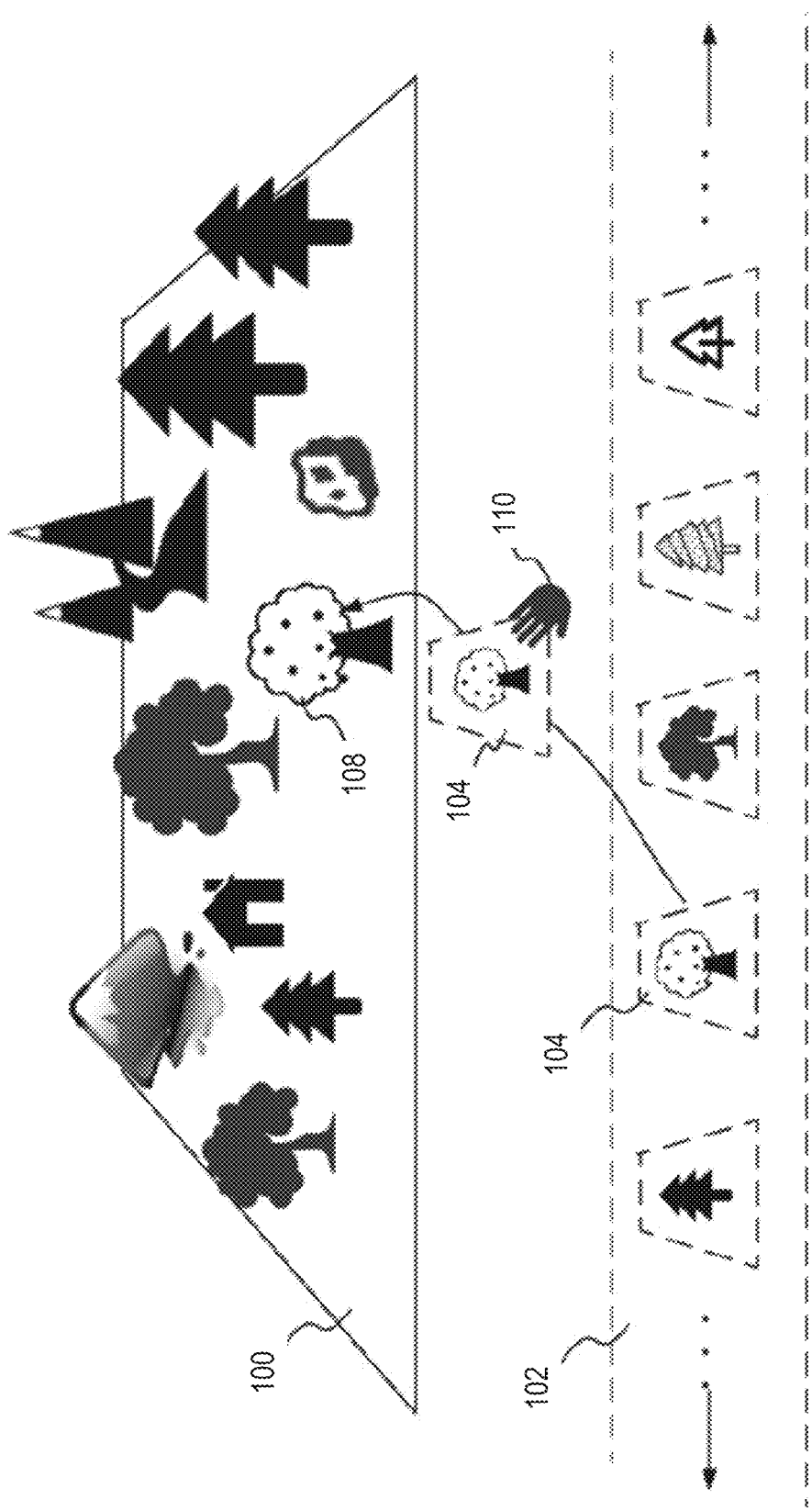
FIG. 1 illustrates an example a perspective view of a virtual environment, presented by a virtual reality editor engine, as seen by a user wearing a head mounted VR or AR headset device.

FIG. 1 illustrates an example a perspective view of a virtual environment 100, presented by a virtual reality (VR) editor engine (not shown in FIG. 1), as seen by a user wearing a head mounted VR or AR headset device. The VR editor engine provides numerous display and interaction operations described herein. More specifically, in the example embodiment, the user can see and may be surrounded by the virtual environment 100 and, in this view, there is provided a floating virtual tray 102 containing a row of cards 104. The VR editor engine presents the tray 102 "floating" in front of the user and within arm's reach. The exact position of the tray could be adjusted to the user's arm length using information from hand-held position trackers or using a calibration procedure, or the like.

The row of cards 104 can extend past the field of view of the user or can wrap around the user. Swiping or grabbing and scrolling the tray 102 with a hand gesture (e.g., scrolling from right to left) would move the cards to the left (e.g., and out of view) and would bring more cards into view from the right. These gestures can reveal cards with different properties (e.g., different types of 3D objects). The cards could be grouped in the tray according to type so that all the same types of objects are displayed near each other. For example there could be a grouping of cards for trees, and another for houses, and another for motorcycles, and the like. Within the groups the cards could be further grouped by size, shape and type. For example, within the tree grouping there could be different types of trees displayed. Swiping horizontally on the tray would bring new cards with different types of trees into view.

In the example embodiment, the user interacts with the card 104 on the tray 102 by grasping the card with their virtual hand 110, or by using some other virtual reality selection method such as gazing, and then placing (e.g., dropping) the card 104 within the virtual environment 100. The placing of the card could be done directly in the large scale virtual environment 100, or on a miniaturized copy of the virtual environment (e.g., a mini virtual board (not shown) that represents the large scale virtual environment and is within the user's reach). When the card 104 is placed in the virtual environment 100, the VR editor engine places a virtual object 108 that matches the object described on the card 104 within the virtual environment 100, and at the drop location. Further, the VR editor engine may configure the virtual object 108 with initial (e.g., default) properties associated with the card 104. The user may then change the properties of the virtual object 108.

In some embodiments, when used with a virtual mini board, the VR editor engine may display the cards on a floating tray between the user and the virtual mini board. The virtual mini board may display live miniature 3D objects representative of larger objects within the user's surrounding large scale virtual reality (VR) environment 100. The virtual mini board is a miniature representation of the larger VR environment, in which each object in the larger environment 100 has a corresponding miniature object on the virtual mini board.

Various interaction mechanics associated with the card tray 102 or cards 104 within the card tray 102 are described through this disclosure. Interaction mechanics may include a triggering gesture and an associated gesture response. The triggering gesture identifies what motion or motions are performed by the user to activate the interaction mechanic. The gesture response identifies what actions are performed in response to detecting the performance of the triggering gesture. In the above example, the interaction mechanic is associated with placing a new asset into the virtual environment 100. The example triggering gesture is grabbing the card 104 from the card tray 102 and dragging the card to a placement location. The gesture response is creating the virtual object 108 in the VR environment 100. Many additional interaction mechanics and their associated triggering gestures and gesture responses are described below.

Figure 2A:
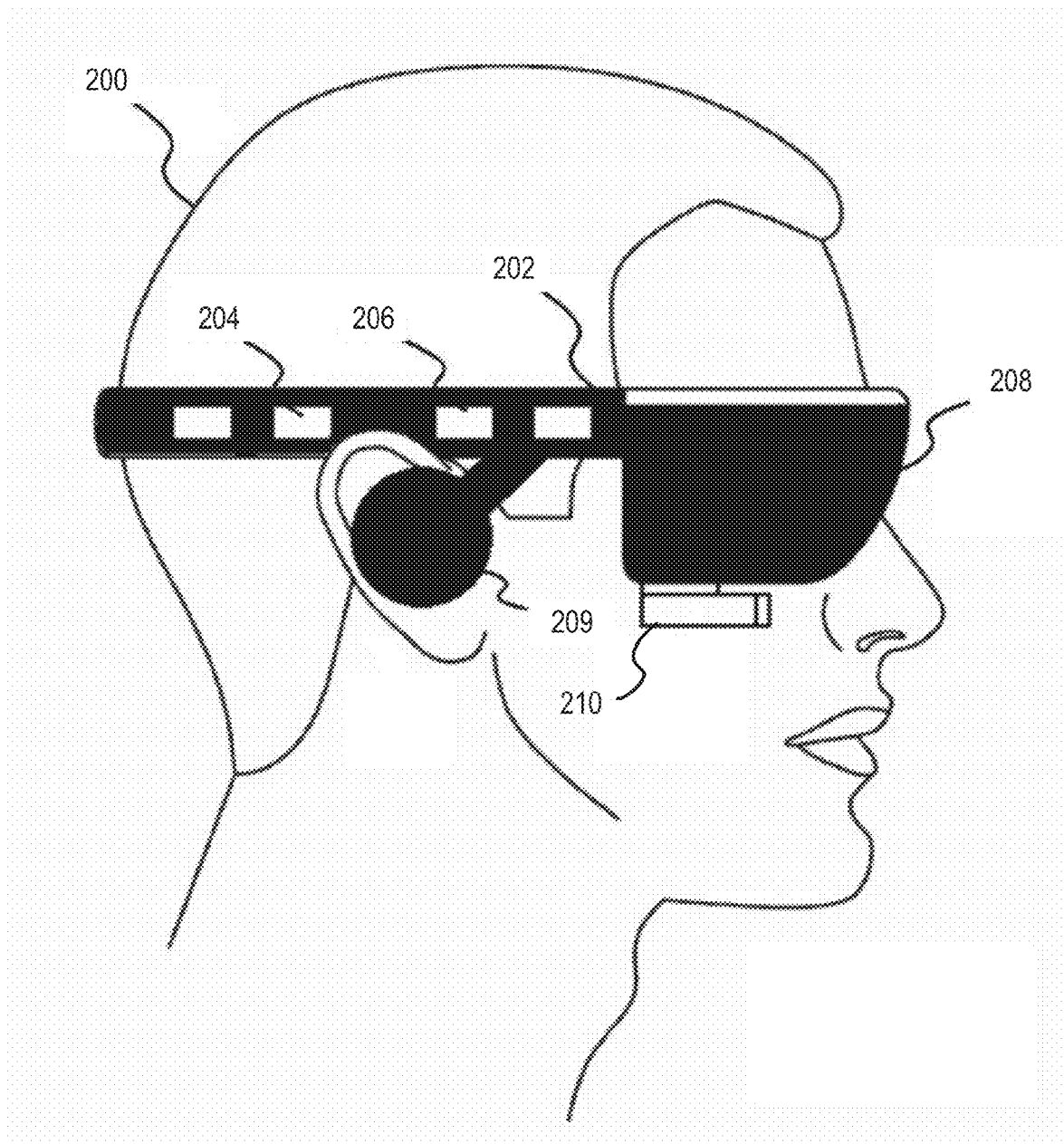
FIG. 2A is a diagram of an example head-mounted display (HMD) worn by a user.

FIG. 2A is a diagram of an example head-mounted display (HMD) 202 worn by a user 200. In the example embodiment, the user 200 (e.g., a game developer or game player) experiences a virtual environment (e.g., via VR) or augmented reality (AR) content while wearing the HMD 202. The HMD 202 includes a visor 208 having two display devices (e.g., one for each eye), a central processing unit (CPU) 204, a graphical processing unit (GPU) 206, and earphone speakers 209. The display device(s) may include one or more opaque display surfaces (e.g., providing VR content, or a complete visual experience for the user 200), or the display device(s) may include one or more semi-opaque or clear display surfaces (e.g., providing AR content to the user 200). In some embodiments, the visor 208 may include a single display device (e.g., split for both eyes). The HMD 202 also includes one or more camera devices 210 configured to capture real-world digital video around the user 200 (e.g., a field of view, a peripheral view, or a 360° view around the user 200). The camera devices 210 may be used to capture the real world environment around the user 200, thereby allowing the HMD 202 to provide that content as a part of a VR environment (e.g., a mixed AR/VR environment) displayed to the user 200. In some embodiments, the HMD 202 may be similar to virtual reality HMD's such as the Oculus Rift®, The HTC Vive®, The Playstation VR®, and the like.

In some embodiments, the user 200 also holds a pair of handheld tracking devices ("handhelds") (not shown), one in each hand. The handhelds provide information about the absolute or relative position and orientation of a user 200's hands and, as such, are capable of capturing hand gesture information. The handhelds may be configured to operate directly with the HMD 202 (e.g., via wired or wireless communication). In some embodiments, the handhelds may be Oculus Touch® hand controllers, HTC Vive® hand trackers, or Playstation VR® hand controllers. The handhelds may also include one or more buttons or joysticks built into the handheld.

In other embodiments, the user 200 may wear one or more wearable hand tracking devices (e.g., motion tracking gloves, not shown), such as those made commercially available by Manus VR (Netherlands). In still other embodiments, hand motion of the user 200 may be tracked without, or in addition to, the handhelds or wearable hand tracking devices via a hand position sensor (not shown, e.g., using optical methods to track the position and orientation of the user 200's hands) such as, for example, those made commercially available by Leap Motion, Inc. (a California corporation). Such hand tracking devices (e.g., handhelds) track the position of one or more of the hands of the user 200 during operation.

Figure 2B:
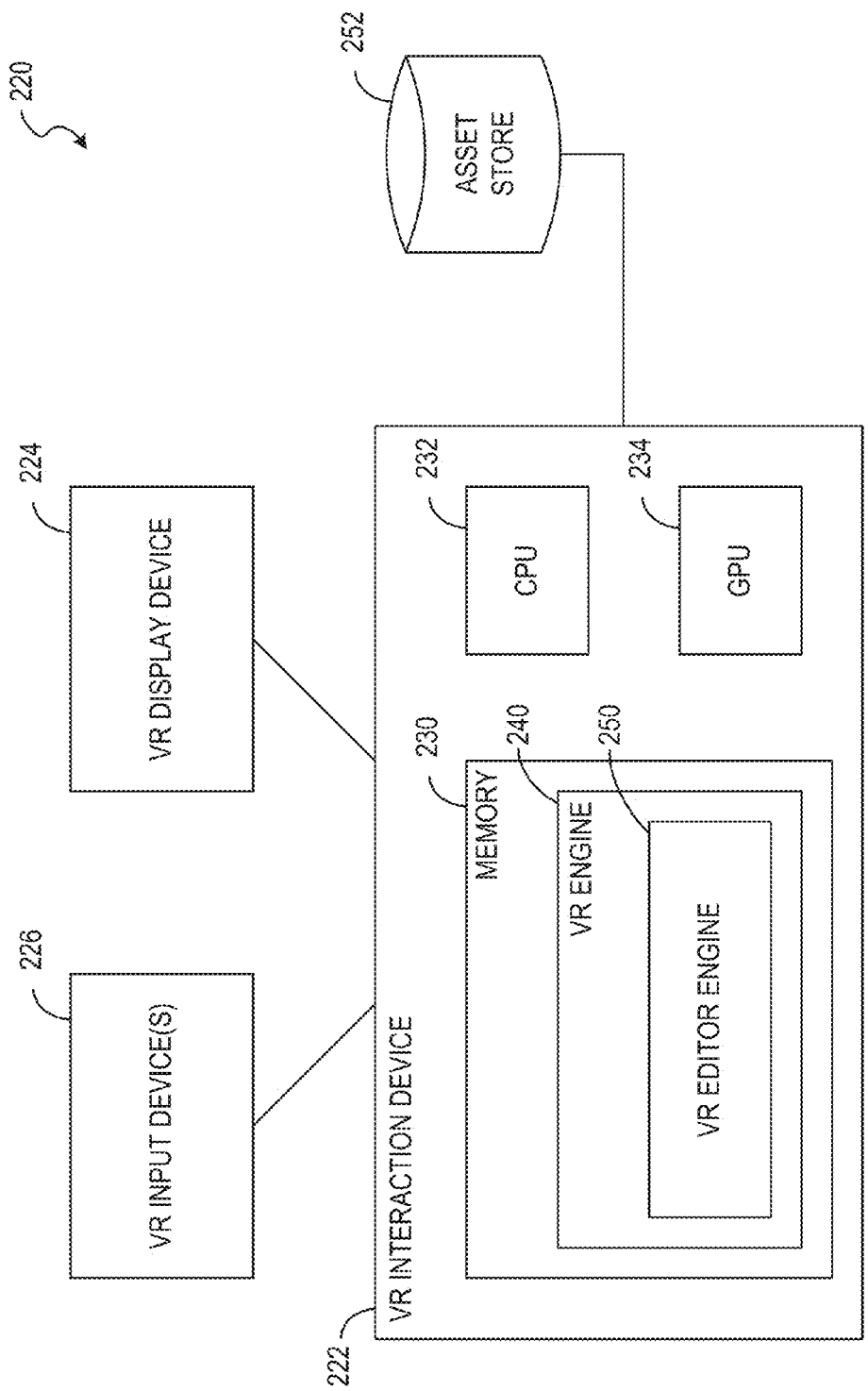
FIG. 2B is a component diagram of an example VR editor system that includes components similar to the HMD shown in FIG. 2A.

FIG. 2B is a component diagram of an example VR editor system 220 that includes components similar to the HMD 202 shown in FIG. 2A. The VR editor system 220 includes a VR interaction device 222, a VR display device 224, and one or more VR input devices 226. In some embodiments, the VR display device 224 may be similar to the visor 208 or the HMD 202, and the VR input device(s) 226 may be similar to the handhelds or other tracking devices described above in reference to FIG. 2A. In the example embodiment, the VR interaction device 222 includes a memory 230, one or more CPUs 232, and one or more GPUs 234. In some embodiments, the CPU 232 may be similar to the CPU 204, the GPU 234 may be similar to the GPU 206, and the VR interaction device 222 may be a part of the HMD 202.

In the example embodiment, the VR interaction device 222 includes a VR engine 240 (e.g., a game engine), executed by the CPU 232 or GPU 234, that provides a virtual environment through the VR display device 224 (e.g., to the user 200). The VR engine 240 includes a VR editor engine 250 implemented within, or otherwise in communication with, the VR engine 240. In some embodiments, the virtual environment provided by the VR engine 240 or the VR editor engine 250 may be a virtual world associated with a computer game (e.g., a VR development environment for creating 3D objects used in the computer game). For example, a developer may utilize the virtual environment for creation and editing of 3D objects or the virtual environment.

The VR editor engine 250 and the VR engine 240 include computer-executable instructions residing in the memory 230 that are executed by the CPU 232 or the GPU 234 during operation. The VR engine 240 communicates with the VR display device 224 (e.g., the HMD 202) and also with other VR hardware such as the VR input device(s) 226 (e.g., motion capture devices such as the handhelds). In some example embodiments, the VR editor engine 250 may be integrated directly within the VR engine 240, or may be implemented as an external piece of software (e.g., a plugin).

In some embodiments, the VR editor system 220 and the various associated hardware and software components described herein may provide AR content instead of, or in addition to, VR content. It should be understood that the systems and methods described herein may be performed with AR content and, as such, the scope of this disclosure covers both AR and VR applications. Further, while many of the examples provided herein describe the user 200 operating within a virtual environment as a developer (e.g., editing the virtual world for later presentation to a player via a gaming engine), it should be understood that the 3D objects and associated animations, so constructed, may later be presented to players via a conventional 2D or 3D display.

During operation, the VR editor engine 250 implements the virtual tray shown in FIG. 1 within a VR environment provided by the VR engine 240. In other embodiments, the VR engine 240 may be an augmented reality application providing an AR environment in which the virtual tray is presented. In the example embodiment, each card 104 is linked to a 3D asset in a remote asset store 252. In some embodiments, the asset (e.g. data representing the asset) may be within an online asset store 252 with a card 104 linking to the asset via a network (not separately shown, e.g., the Internet). In some embodiments, the asset data may be stored in local memory 230, or the asset data may be shared between local memory 230 and remotely in the asset store 252. The VR editor engine 250 is executed by the CPU 232 of the VR interaction device 222. The VR editor engine 250 extracts asset information from the memory 230 and from the asset store 252 in order to display an asset on a card 104 in the tray 102 within a VR environment 100, and displayed to the user via a head mounted display 202.

Figure 3:
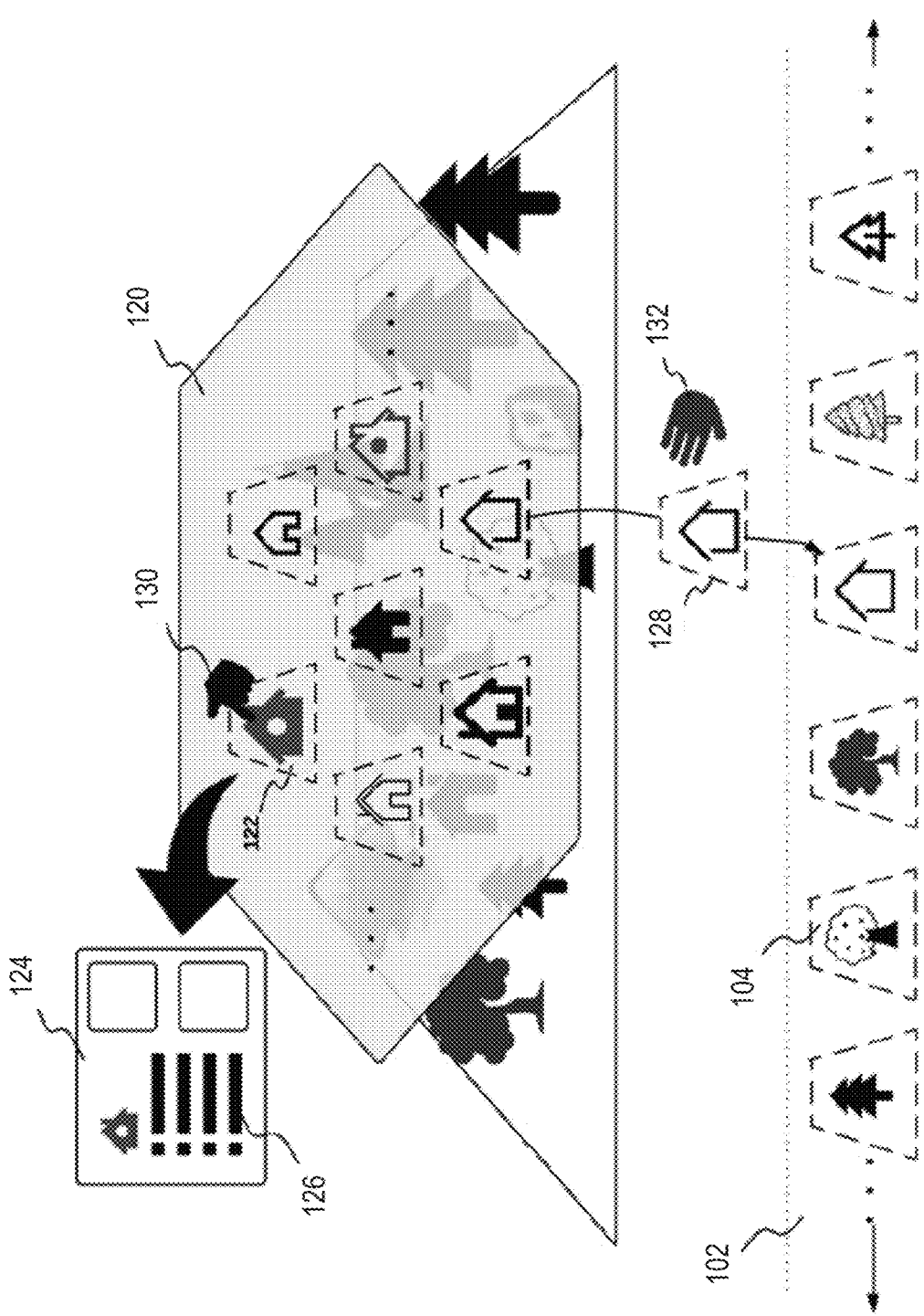
FIG. 3 illustrates a user-perspective view of a second card tray displayed to the user by the VR editor engine in the virtual environment, in addition to the first card tray.

FIG. 3 illustrates a user-perspective view of a second card tray 120 displayed to the user 200 by the VR editor engine 250 in the virtual environment 100, in addition to the first card tray 102. In the example embodiment, the second tray 120 includes multiple remote assets from the remote asset store 200, and the first card tray 102 includes local assets stored in memory 208. In one event, the user presses a card 122 with a virtual finger 130 (or otherwise selected with a VR selection method such as gazing) and, in response, the VR editor engine 250 displays a more detailed and larger card 124 that includes more details 126 about the asset associated with the card 122. In another event, a card 128 from the second tray 120 may be dragged to the first card tray 102 and, in response, the VR editor engine 250 downloads the asset data for that card 128 to the local memory 230, and the card 128 would then be presented in the first tray 102.

Figure 4A:
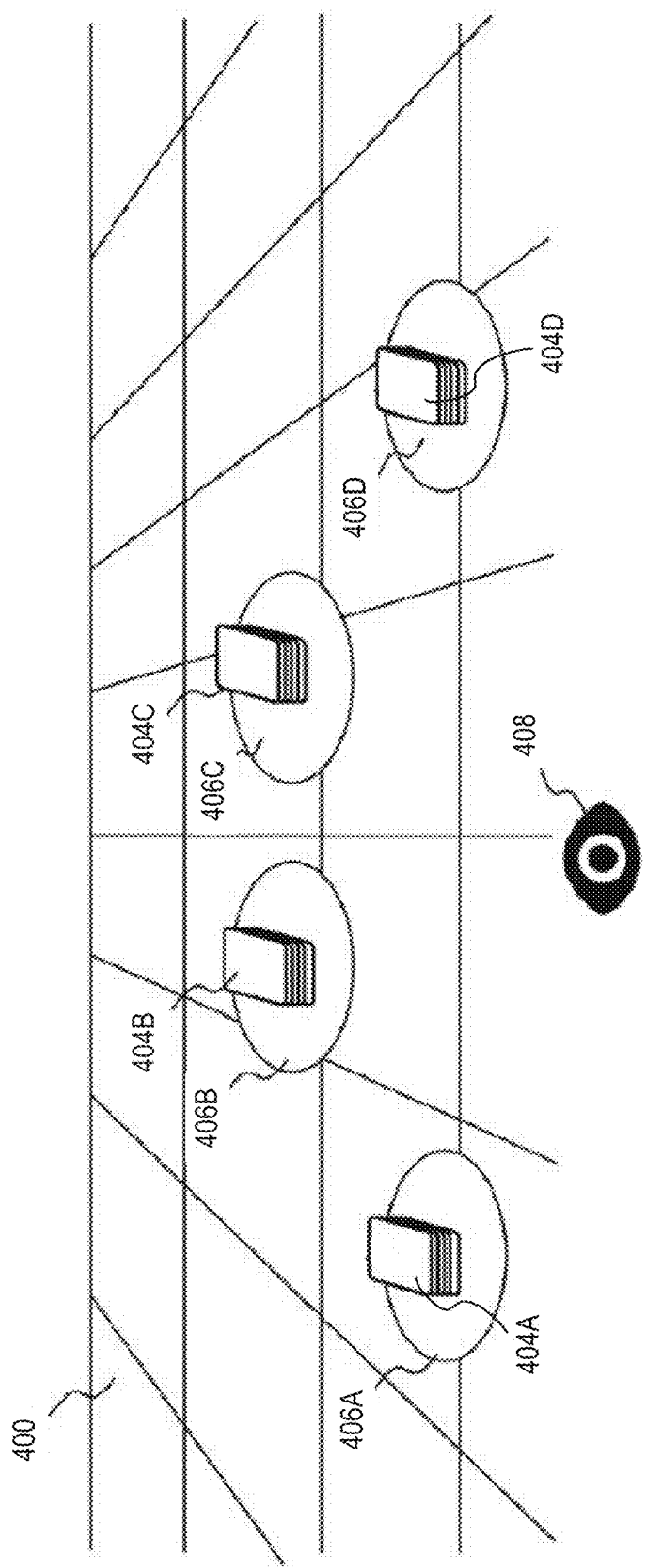

FIGS. 4A and 4B illustrate user-perspective views of a deck inspection process in a VR environment 400 for selecting the set of cards 104 that are used to populate the tray 102. In the example embodiment, the VR editor engine 250 displays multiple islands 406A, 406B, 406C, 406D (collectively, "islands 406") floating within the VR environment 400. On each island 406 is a deck of cards 404A, 404B, 404C, 404D (collectively, "decks 404"). Each deck 404 represents and identifies a different set of cards 104.

Further, FIG. 4A includes an eye icon 408. The eye icon 408 represents the point or area of focus (or just "gaze" or "focus" 408, for sake of convenience) where the user 200 has oriented or focused the HMD 202 within the VR environment 400. The focus 408 of the user 200 may be tracked, for example, with eye tracking technology integrated into the HMD 202. In the example embodiment, the eye icon 408 is not displayed or seen by the user, but rather is included in FIGS. 4A and 4B for purposes of illustrating orientation of the HMD 202. In some embodiments, a focus icon such as the eye icon 408 may be displayed. In the example embodiment, the focus 408 is currently centered below the islands 406 (e.g., not focused on any of the islands 406 or decks 404).

In FIG. 4B, the user 200 shifts the focus 408 to the island 406C. As the focus 408 nears or enters the island 406C, the VR editor engine 250 expands the deck 404C associated with that island 406C as illustrated in FIG. 4B. The expanded deck 404C may further display a subset of the cards 104 such that the user 200 may determine what type of cards 104 are in that deck 406C. For example, deck 404A may represent buildings, structures, and figures in a "modern world" game genre (e.g., skyscrapers, $20^{th}$ century architecture buildings, concrete street textures, modern-dressed pedestrians, and so forth), where the deck 404C may represent a "medieval world" game genre (e.g., castles, barns, stone street textures, peasants and royalty, and so forth). As such, the user 200 may view the various decks 404 by, for example, shifting focus to each deck 404, inspecting a few of the representative cards 104 from that deck 404, and moving on to another deck 404 until the user 200 finds the deck 404 they desire. As the user 200 moves the focus 408 away from the deck 404C, the VR application 210 collapses the deck 404C back to its original depiction (e.g., as shown in FIG. 4A).

In the example embodiment, the focus 408 of the HMD 202 activates and deactivates the deck 404 expansion and collapse. In other embodiments, other input selection mechanics may be used to expand and view the decks 404. For example, the user 200 may use a hand held input device to reach out toward an island 406 or a deck 404 (e.g., a virtual hand, not shown in FIGS. 4A and 4B), thereby causing the deck expansion and collapse described above. For another example, the user 200 may use buttons or joystick on a hand held input device to toggle or move between the islands 406, or otherwise control focus between the decks 404.

Figure 5B:
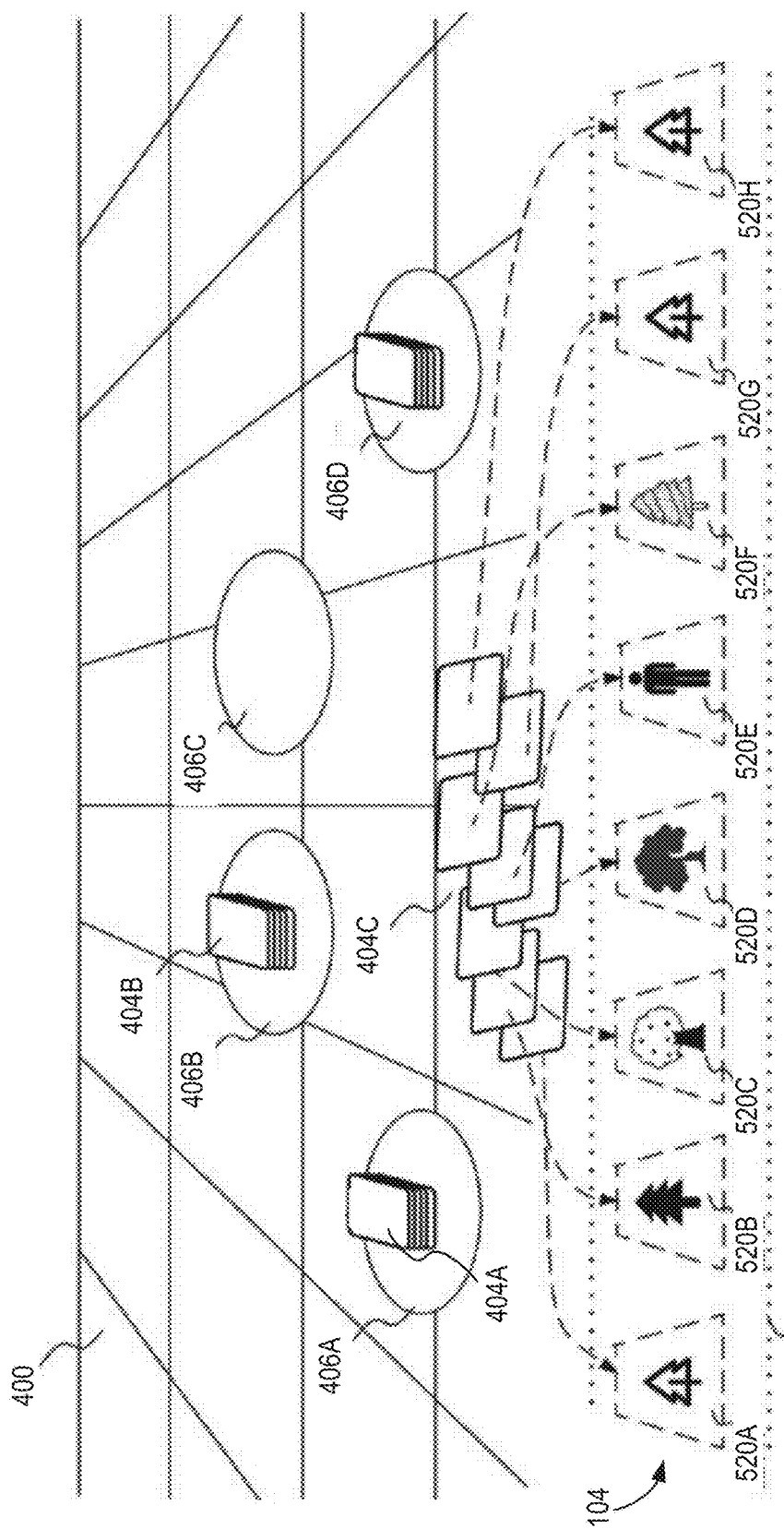

FIGS. 5A and 5B illustrate user-perspective views of a deck selection process in the VR environment 400 in which the user 200 selects the deck 404C of cards 104 used to populate the tray 102. In FIG. 5A, the expanded deck 404C is "grabbed" by a virtual hand 510 (e.g, using a VR input device), "dragged" in the VR environment 400 to a front position, and "released" in front of the user 200. FIG. 5B illustrates the VR editor engine 250 populating the tray 102 with cards 520A-520H (collectively, cards 520) from the selected deck 404C. As such, the cards 520 become usable as the cards 104 in the tray 102, with the tray 102 becoming usable for creating or editing the VR environment 400.

Figure 6:
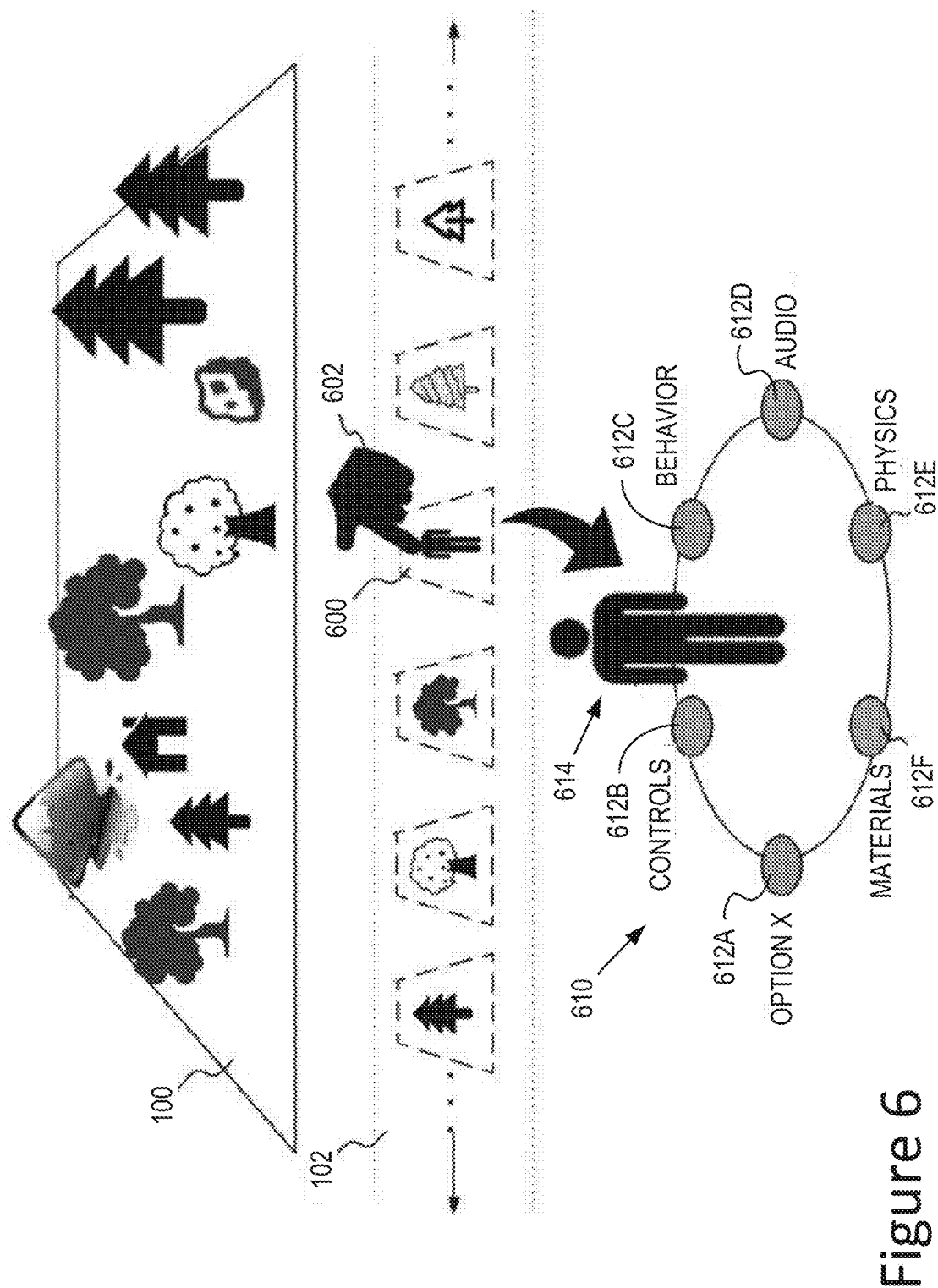
FIG. 6 illustrates a card selection action in which the user interacts with a card presented by the VR editor engine in the tray.

FIG. 6 illustrates a card selection action in which the user 200 interacts with a card 600 presented by the VR editor engine 250 in the tray 102. In the example embodiment, the user 200 engages a card submenu (or just "submenu") 610 by pushing down on (e.g., pressing and holding, clicking and dragging) the card 600 in the tray 102 with a virtual hand 602, thereby causing the VR editor engine 250 to reveal the submenu 610. The submenu 610 includes, at its center, a 3D virtual representation of a 3D object 614 associated with the card 600 (e.g., a character figure, in this example). The submenu 610 is displayed as a circular wheel or elliptical ring that includes, on its periphery, multiple submenu items 612A-612F (collectively, submenu items 612) associated with or otherwise implicated by the selected card 600. Each submenu item 612 represents an aspect of the 3D object 614 including, for example, Option X 612A, Controls 612B, Behavior 612C, Audio 612D, Physics 612E, Materials 612F, and the like. These submenu items 612 may be used by the user 200 to modify properties of the 3D object 614 (e.g., characteristics such as movement physics, sounds, visual properties, and so forth).

Figure 7A:
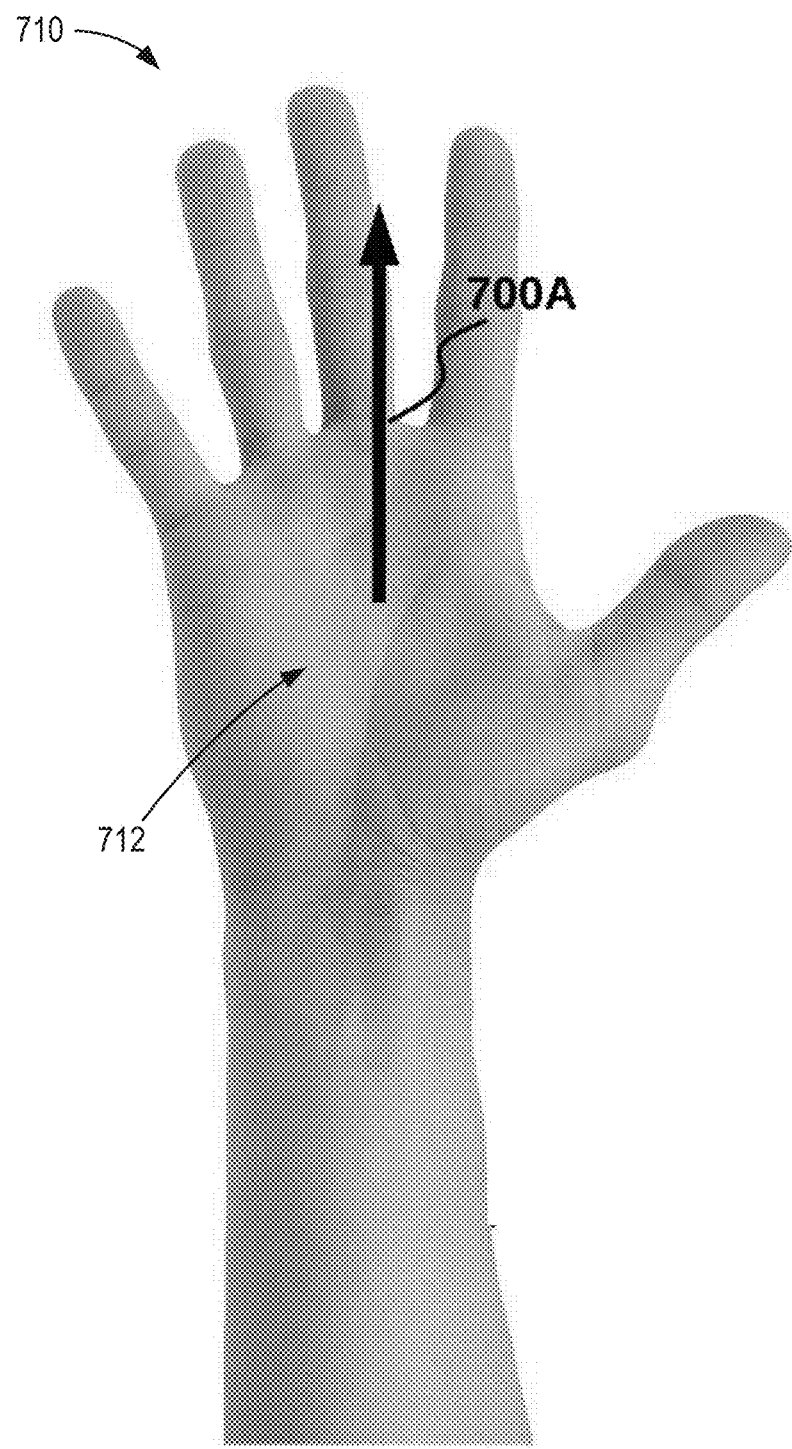
FIGS. 7A, 7B and 7C illustrate user-perspective views of three modes of interacting with the virtual tray using a virtual hand.
Figure 7B:
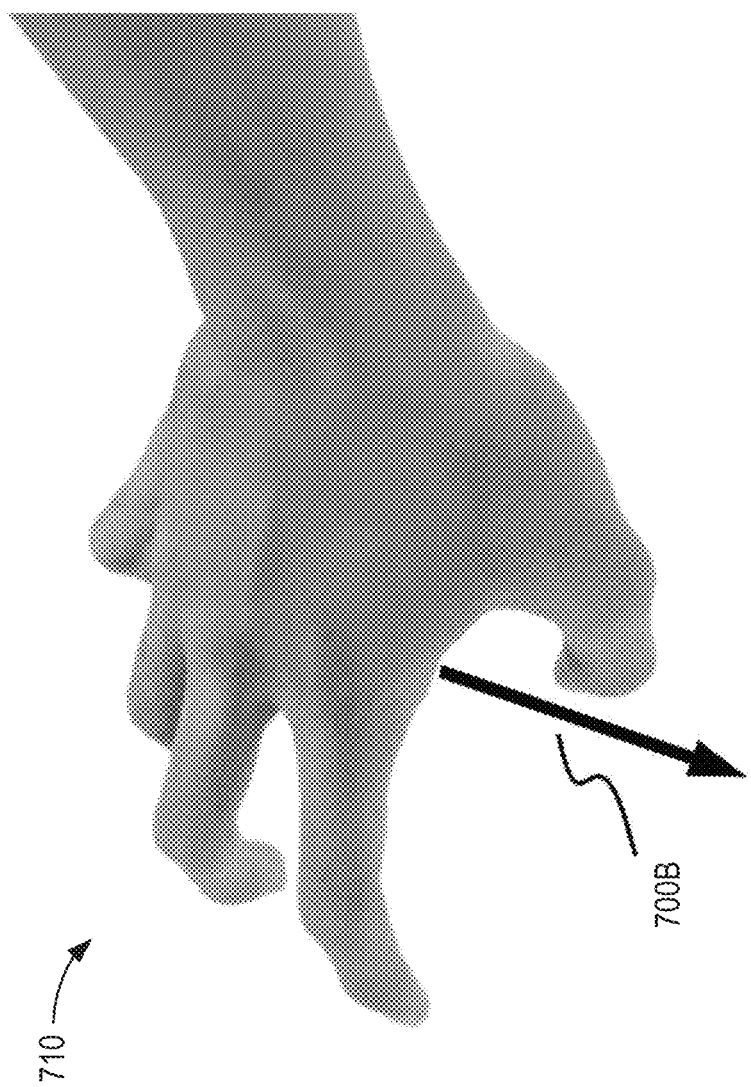
Figure 7C:
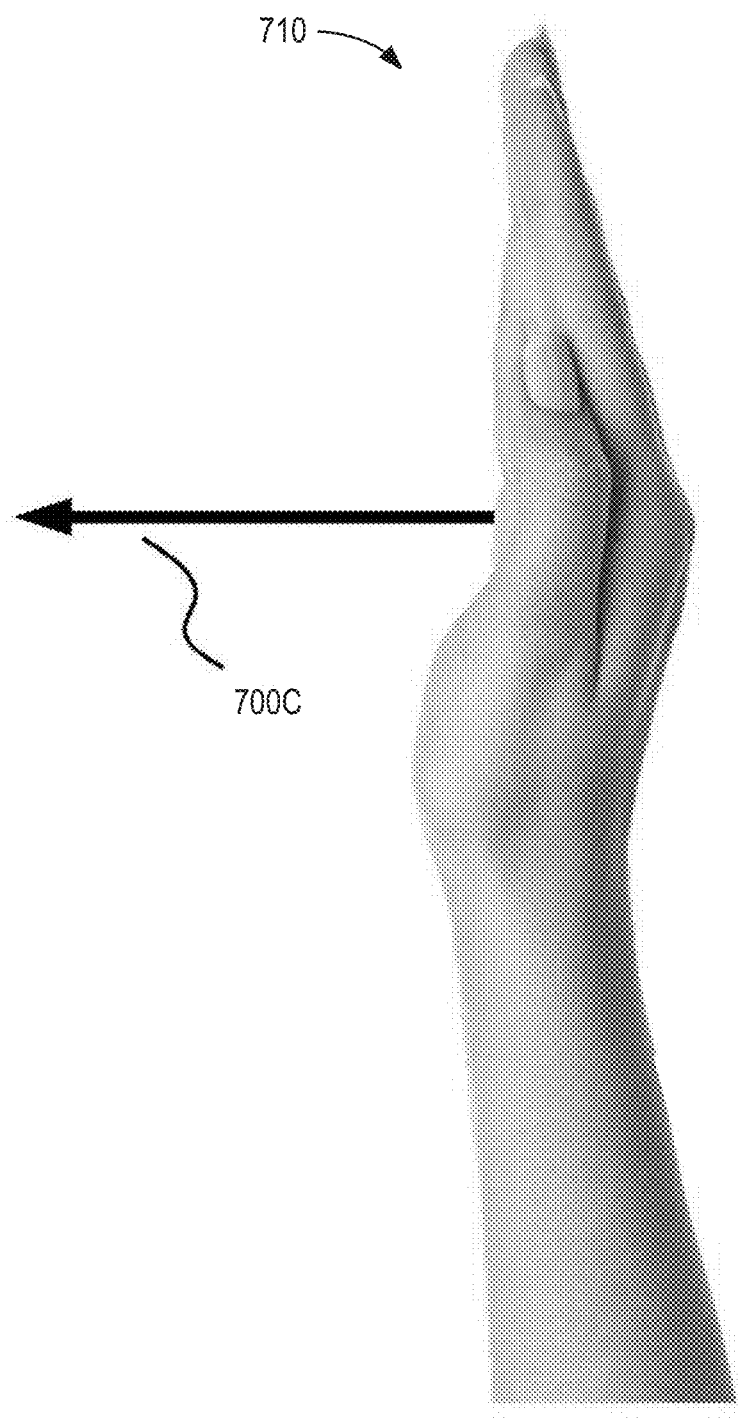

FIGS. 7A, 7B and 7C illustrate user-perspective views of three modes of interacting with the virtual tray 102 using a virtual hand 710. In some embodiments, the virtual hand 710 is controlled by the user 200 (e.g., via a motion tracking device), may be similar to the virtual hands 510, 602, and may be represented in the VR environments described herein. In the example embodiment, an orientation state of the virtual hand 430 determines various modes of interaction between the hand 430 and the tray 102 (e.g., with the cards 104, 600). In the example embodiment, the virtual hand 710 includes three orientation states, each of which is represented as a vector arrow 700A, 700B, 700C (collectively, vector arrows 700) (e.g., based on which way the palm is facing). The vector arrows 700 are each based on a vector approximately normal to a palm 712 of the hand 710 and facing out from the hand 710. These vector arrows 700 may be referred to herein as palm vectors 700. Each palm vector 700 enables different functionality for interacting with the tray 102 based on the orientation of the palm vector 700. For ease of discussion, the orientation states may be identified herein based on their associated palm vectors 700. The three orientations 700 include the palm 712 of the virtual hand 710 facing up ("palm up" orientation 700A), the palm 712 facing down ("palm down" orientation 700B), and the palm 712 facing horizontally ("palm horizontal" orientation 700C).

In the example embodiment, the palm up orientation 700A is defined as any virtual hand 710 position wherein the palm vector 700A is within a pre-determined angle of vertically upwards in the VR environment 100, 400 (e.g., within 30 degrees or within 45 degrees of vertically upward). The palm down orientation is defined as any virtual hand 710 position wherein the palm vector 700B is within a pre-determined angle of vertically downward in the VR environment 100, 400 (e.g., within 30 degrees or within 45 degrees of vertically downward). The palm horizontal state is defined as any virtual hand 710 position wherein the palm vector 700C is within a pre-determined angle of horizontal within the VR environment (e.g., within 30 or 45 degrees of horizontal). In some embodiments, two of the three orientations may be defined as within a pre-determined angle of their respective absolute, and the third may be defined as the absence of both of the other two (e.g., if not in palm up orientation or palm down orientation, then the orientation is considered in palm horizontal orientation).

In some embodiments, each of the three orientation 700 of the palm 712 are visually distinguished for the user 200 by displaying the virtual hand 710 with a different color for each orientation (e.g., green for palm up, blue for palm down, and cyan for palm horizontal). As the user 200 moves the orientation of their real hand into one of the three orientations 700, the orientation 700 of the virtual hand 710 tracks with the real hand of the user 200, the orientation 700 of the palm 712 is updated as the user 200 moves, and the color of the hand 710 is changed according to the three orientation colors.

Figure 8A:
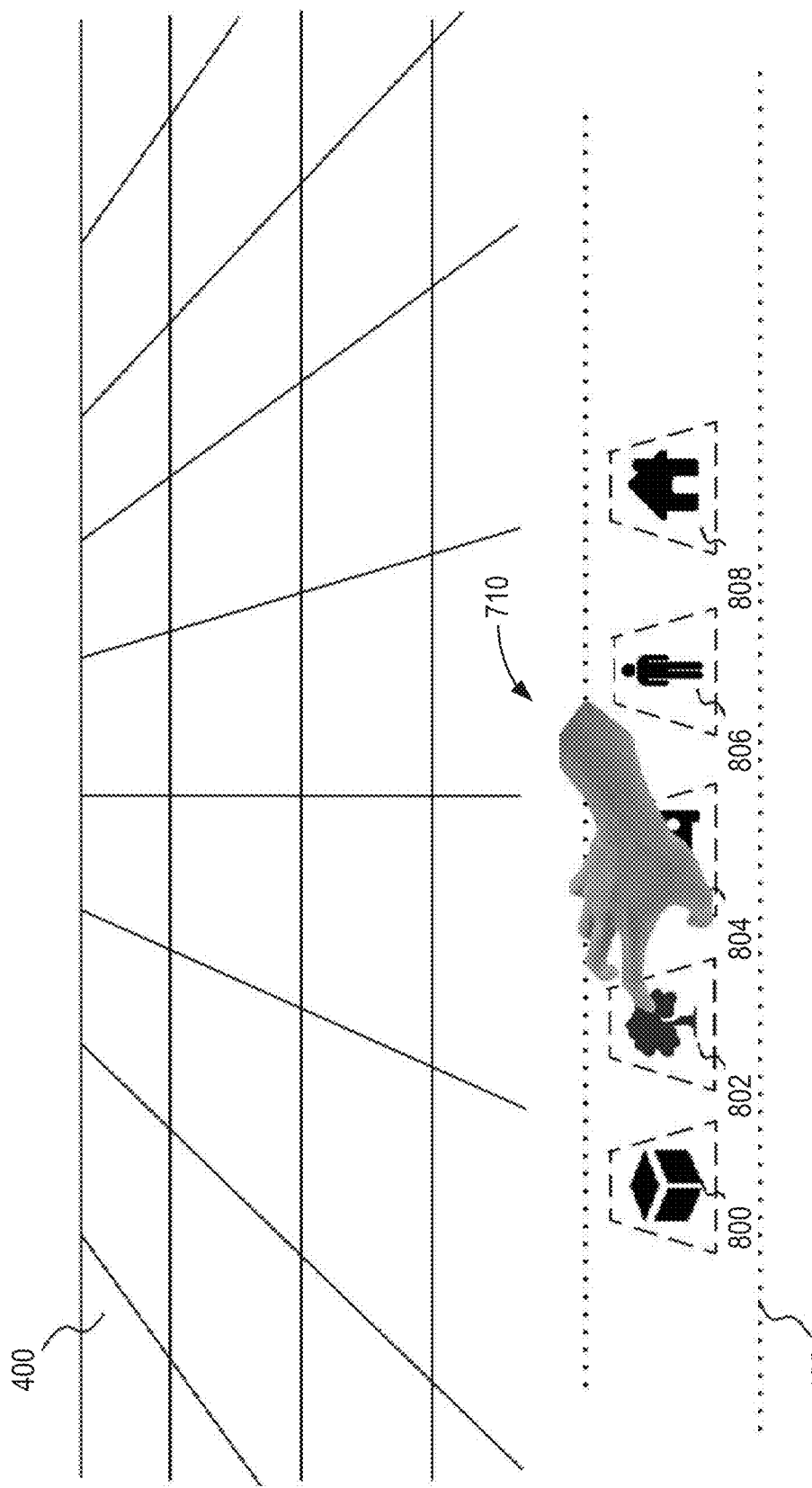

FIGS. 8A and 8B illustrate user-perspective views of example operations in which the virtual hand 710 interacts with the card tray 102 in the palm down orientation 700B. In the example embodiment, the tray 102 includes cards 800, 802, 804, 806, and 808, which may be similar to the cards 104, 520, 600. The palm down orientation 700B enables the user 200 (e.g., via the hand 710) to interact with (e.g., select) an individual card 802 on the tray 102. In some embodiments, the interaction may include pushing down on the card 802 (e.g., to expose the card submenu 610). In some embodiments, the interaction may include pushing an edge of the card 802, thereby flipping the card 802 (e.g., causing the card to rotate about a central axis by pushing up or down on an edge of the card).

In some embodiments, the rotation of the card 802 (e.g., by pushing it down with the virtual hand 710 when in the palm down orientation 700C, or by flipping it up with the virtual hand 710 when in the palm up orientation 700A) transforms the card 802 (e.g., which may initially represent a category of cards) into multiple cards 802A, 802B and 802C, as shown in FIG. 8B. In the example embodiment, the cards 800, 802A, 802B, 802C, 804, 806, 808 of the card tray 102 are structured and expanded or contracted hierarchically. In this example, the three tree cards 802A, 802B, 802C are "leaf cards" within the card hierarchy (e.g., they are leaf nodes within a card tree, having no other cards beneath them). In some embodiments, a category card such as the card 802 may have other category cards beneath itself (e.g., as sub-categories).

For example, the example 'Tree' card 802 is a category card representing one or more types of trees that may be inserted within the VR environment 400. Flipping the 'Tree' category card 802 exposes the three tree cards 802A, 802B and 802C (e.g., replacing the 'Tree' category card 802), and causes the category cards 800, 804, 806, 808 on either side to move over to make space for the expansion. For example, FIG. 8B shows the shape category card 800 moving to the left and the car category card 804 along with the character category card 806 and the house category card 808 moving to the right to make space for the sub-category cards 802A, 802B and 802C.

In some embodiments, a category card, such as the cards 800, 802, 804, 806, 808, represents a category of object such as houses, cars, trees, characters, tables, shapes, and the like. Category cards can also represent actions such as, for example, adding a lighting effect to a scene, or adding a sound effect to a scene or object. Sub-category cards may represent further refinement of such categories such as, for example, old cars, muscle cars, racing cars, family cars, and the like, for a cars category card 804. In other words, there can be a nested hierarchy of cards such that sub-category cards can themselves expand into other sub-category cards. Sub-category cards can also be cards with no sub-categories, but rather cards that are directly linked to an asset (e.g., leaf nodes in the card hierarchy).

FIGS. 9A, 9B, 9C, and 9D illustrate user-perspective views of example operations in which the virtual hand 710 interacts with the card tray 102 in the palm horizontal orientation 700C. In the example embodiment, the VR editor engine 250 allows scrolling functionality for the card tray 102 (e.g., from side to side, left or right) when in the palm horizontal orientation 700C. While in the palm horizontal orientation 700C, when the hand 710 moves within a predetermined distance of the card tray 102 within the VR environment 400 (e.g., via use of a collider for the tray 102), the hand 710 grabs (e.g., attaches to) the tray 102. As the user 200 moves the hand 710 to the left or to the right (e.g., maintaining the hand 710 in palm horizontal orientation 700C), the cards 800, 802A, 802B, 802C, 804, 806, 808 move to the left or the right accordingly (e.g., as shown between FIG. 9A and FIG. 9B). In the example perspective shown here, the user 200 has grabbed the card tray 102 and is scrolling the tray 710 to the left.

Figure 9A:
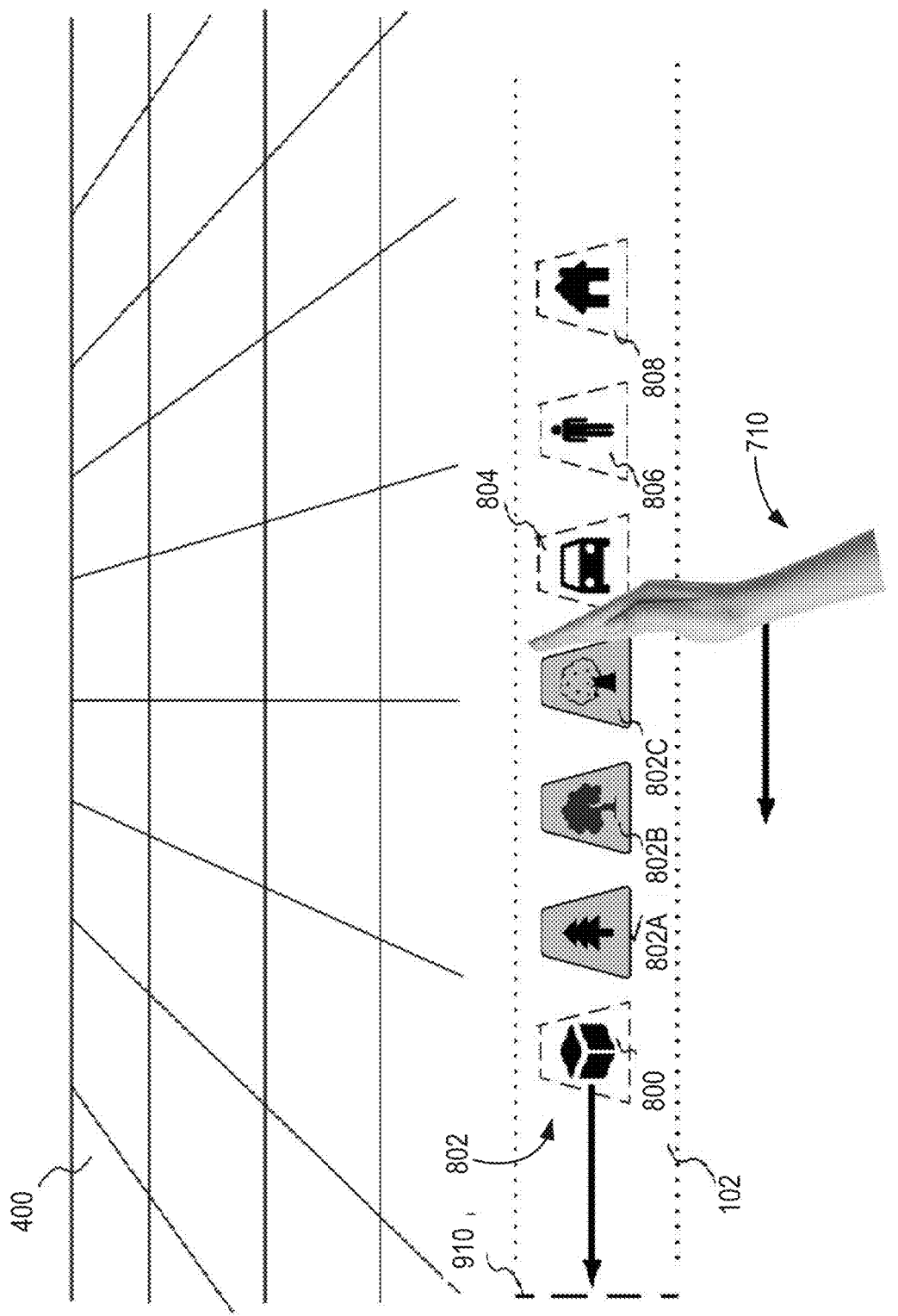
Figure 9D:
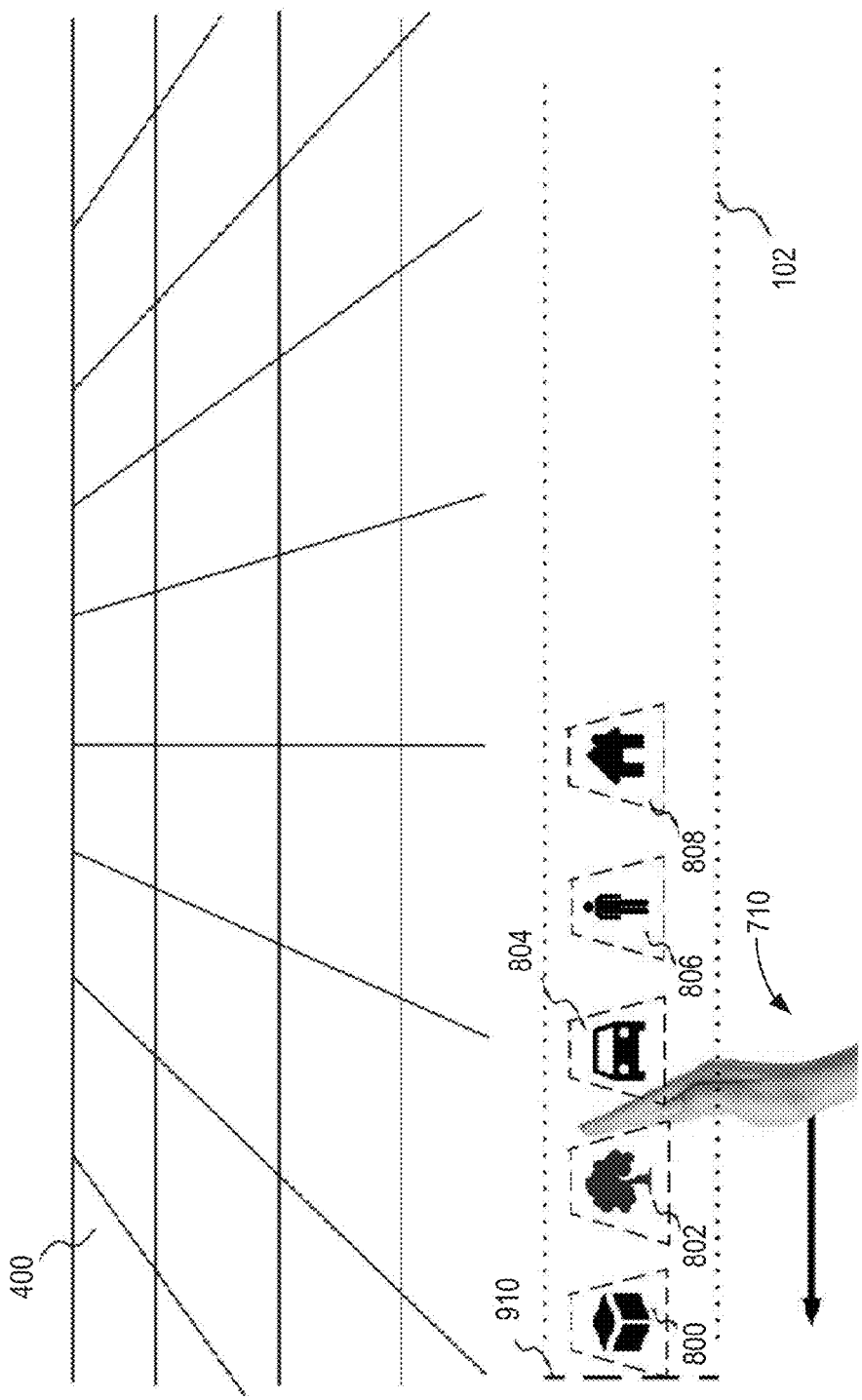

In the example embodiment, the card tray 102 has a limit to the extent of scrolling, determined by a boundary 910 within the virtual environment 400. When the scrolling of the card tray 102 causes an end of the tray 102 to reach the boundary 810 (e.g., the left-most card 800, in this example), the sub-category cards closest to the boundary (e.g., cards 802A, 802B, 802C) collapse back into the category card that spawned them (e.g., card 802), as shown between FIGS. 9B, 9C, and 9D. More specifically, in FIG. 9B, the left-most card 800 has just reached the boundary 910. In FIG. 9C, continued left motion causes the cards 802A and 802C to begin collapsing into a remaining card 802B. The collapsing cards 802A, 802C may shrink in size, or flip over onto the remaining card 802B, or slide under the remaining card 802B. FIG. 9D shows the remaining card 802 after the collapse of the subcards 802A, 802B, 802C. At such time, all subcards in the tray 102 have been collapsed, and scrolling of the tray 102 ceases (e.g., stopped by the boundary 910). In some embodiments, only cards that appear to the side of the hand 710 in the direction of the motion (e.g., only cards to the left of the hand 710) collapse as described here. It should be understood that, while only a left-side boundary 910 is shown in FIGS. 9A-9D, the VR editor engine 250 may similarly provide a right-side boundary that is active during movements to the right. In some embodiments, the sub-category cards may be collapsed into the category card that spawned them with an animation (e.g., a card flip animation). In some embodiments, the tray may bounce off the boundary 810.

Figure 10A:
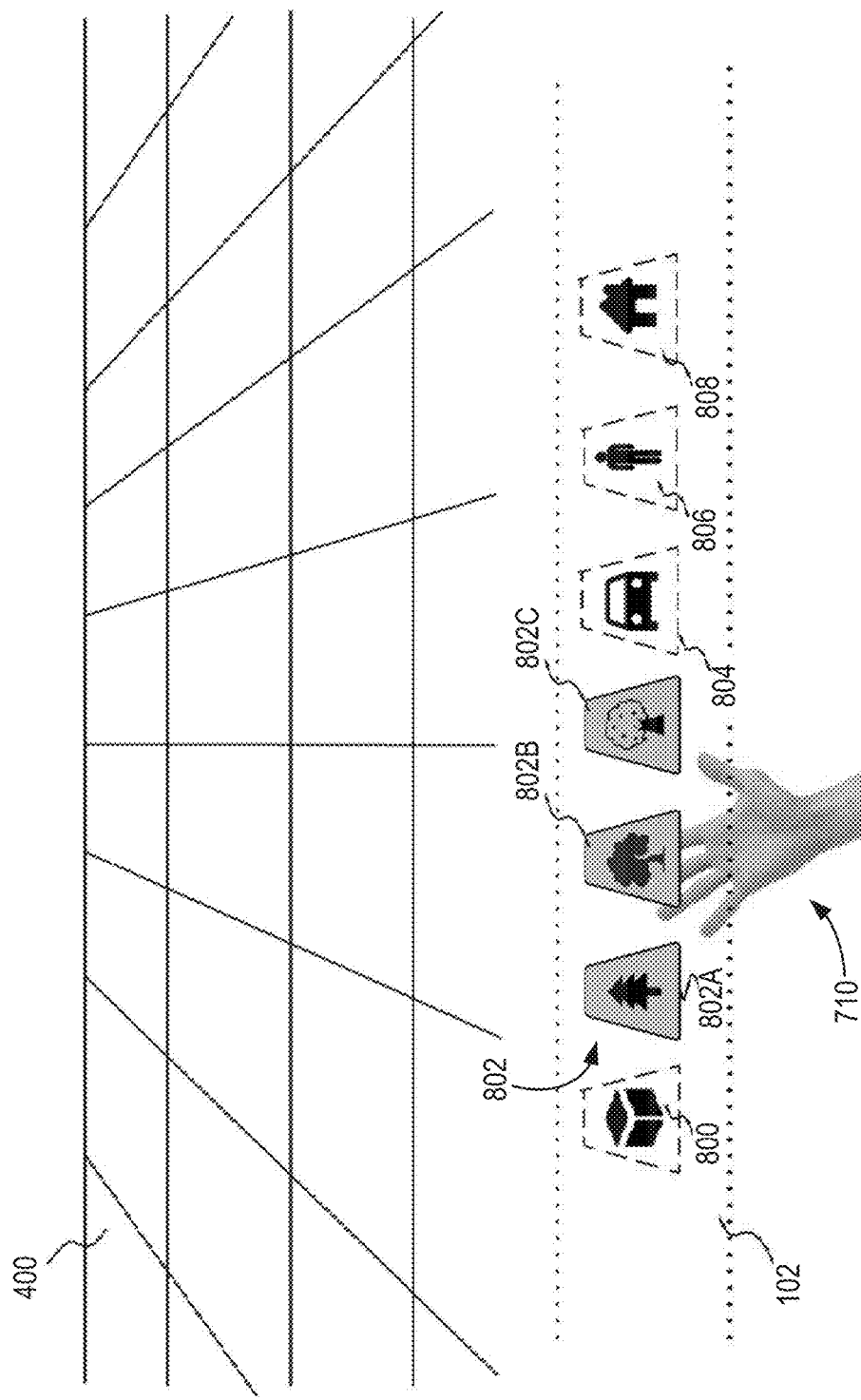
FIGS. 10A, 10B and 10C illustrate user-perspective views of example operations in which the virtual hand interacts with the card tray in the palm up orientation.
Figure 10B:
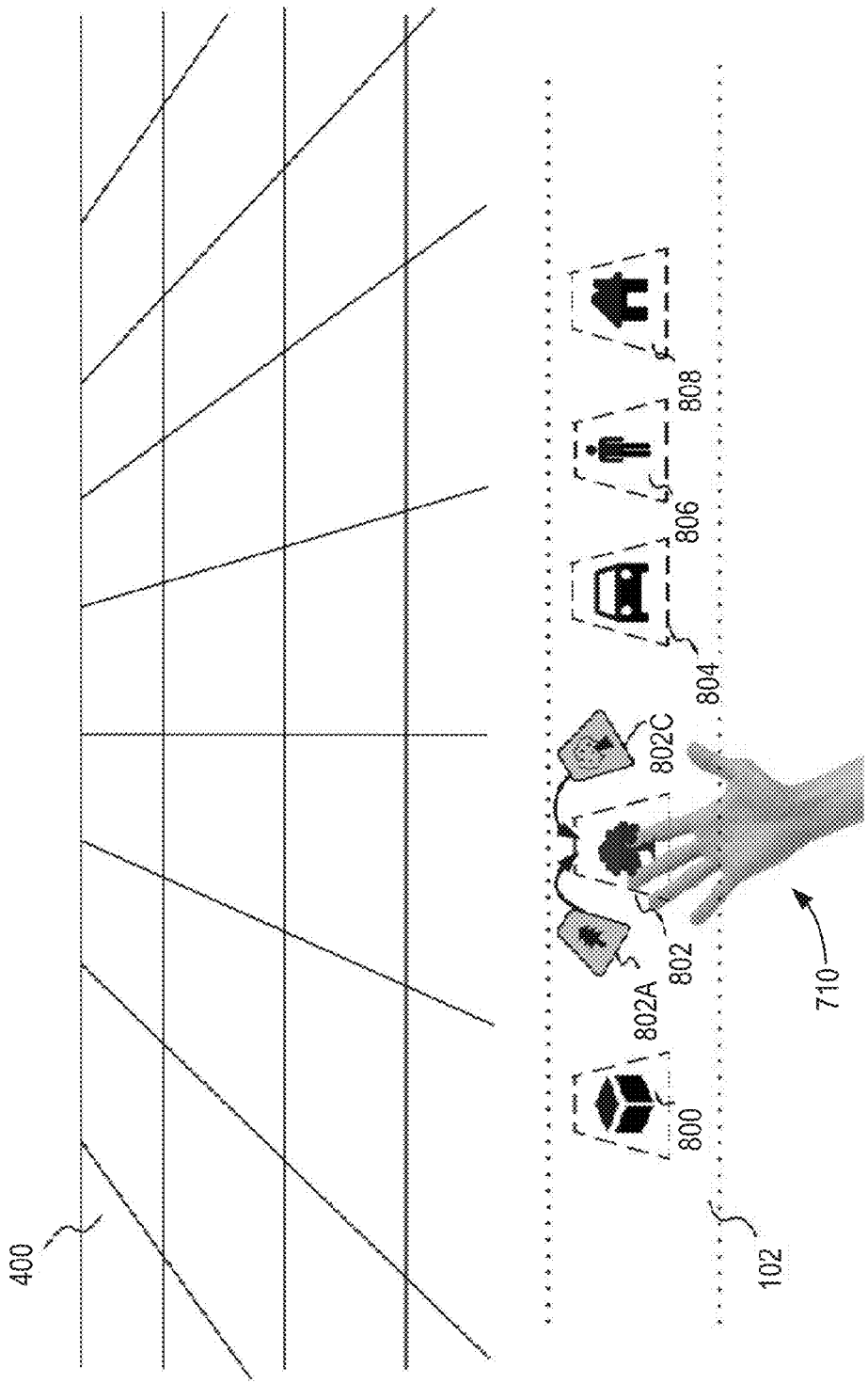
Figure 10C:
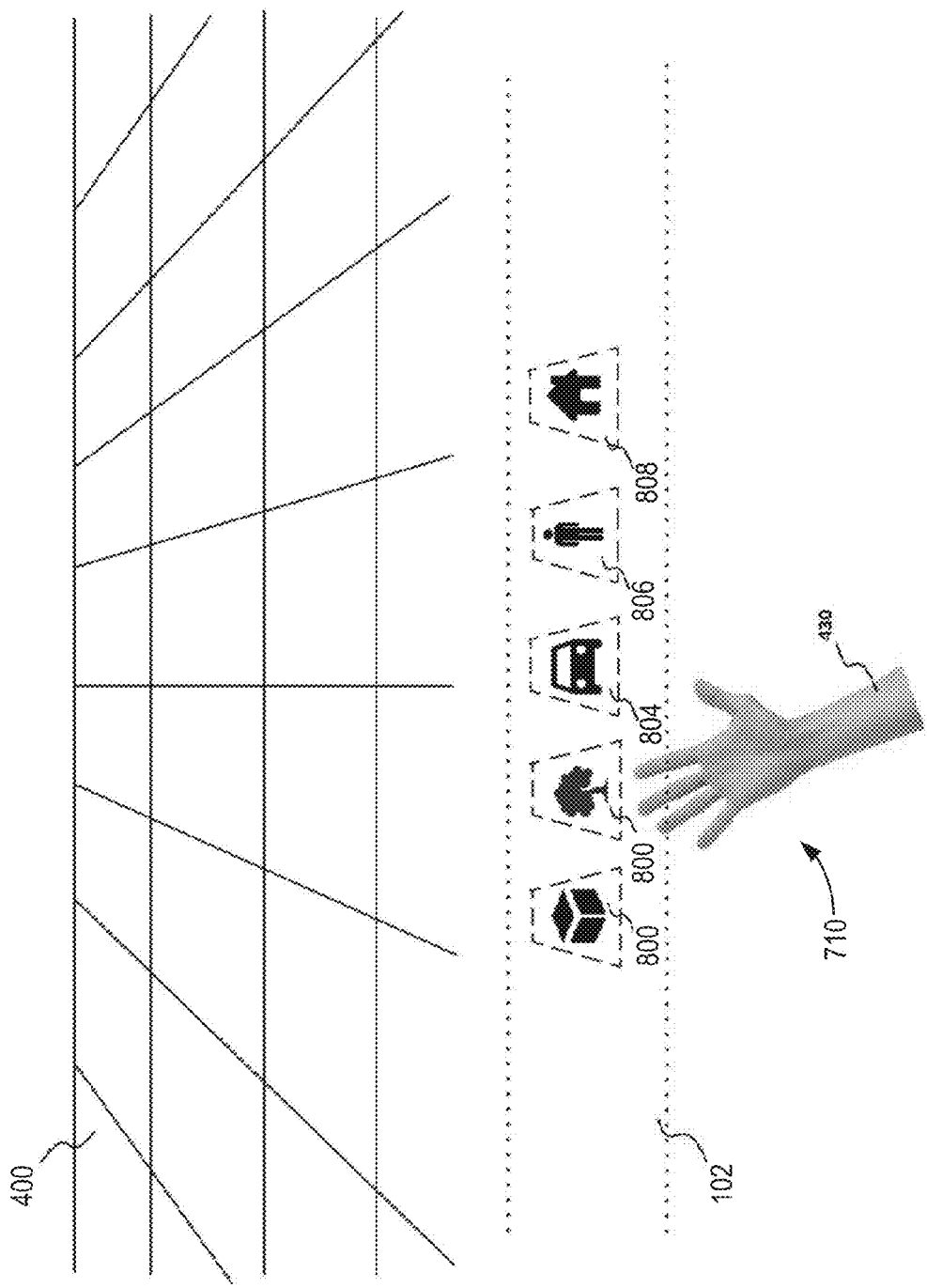

FIGS. 10A, 10B, and 10C illustrate user-perspective views of example operations in which the virtual hand 710 interacts with the card tray 102 in the palm up orientation 700A. In the example embodiment, the VR editor engine 250 allows the user 200 to collapse an extended set of cards 802 in the palm up orientation 700A. In some embodiments, an expanded set of sub-category cards (e.g., cards 802A, 802B, 802C) can be collapsed by maintaining the virtual hand 430 in the palm up orientation 700A and pushing upwards on any one of the cards 802A, 802B, 802C in the expanded set of sub-category cards. The sub-category cards 802A, 802B, 802C can be collapsed into the parent category card 802 with an animation (e.g., a card flip animation). In some embodiments, an expanded set of sub-category cards may be collapsed with a open hand 710 squeezing into a closed hand (not separately depicted) or pinching of fingers on any one or more of the sub-category cards 802 (e.g., based on a thumb on card 802C and other fingers on card 802B).

FIG. 10A illustrates the set of sub-category cards 802A, 802B and 802C in an expanded layout. The virtual hand 710, while in the palm up orientation 700A, pushes upwards on a bottom edge of one or more of the cards 802A, 802B, 802C. FIG. 10B illustrates the set of sub-category cards 802A and 802C in the process of collapsing into the parent category card 802 from which the sub-category cards were originally spawned. In some embodiments, the sub-category card 802B collapses into the category card 802 (e.g., 802B rotates to reveal 802). In some embodiments, the visual aspect of the collapse can be linked to an animation (e.g., a folding of the outer cards into a center card (e.g., card 802B). FIG. 10C illustrates the card tray 102 after the collapse, with the category cards 800, 804, 806, 808 on either side of the collapsed card 802 realigned (e.g., moving closer together) to eliminate the empty space vacated by the collapsed cards 802A, 802B, 802C. The shape category card 800 moves to the right and the car category card 804 with the character category card 806 and the house category card 808 move to the left to eliminate the space left by the collapsed sub-category cards 802A, 802B and 802C.

In the example embodiment, while the virtual hand 710 is in one of the orientation states (e.g., palm up, palm horizontal, palm down), the virtual hand 710 is restricted from the operations specific to the other orientation states. For example, while the virtual hand 710 is in the palm up orientation 700A, the virtual hand 710 is restricted from selecting and expanding category cards as it does when the virtual hand 710 is in the palm down orientation 700B, nor can the virtual hand 710 scroll the card tray as it can when in the palm horizontal orientation 700C.

Figure 11:
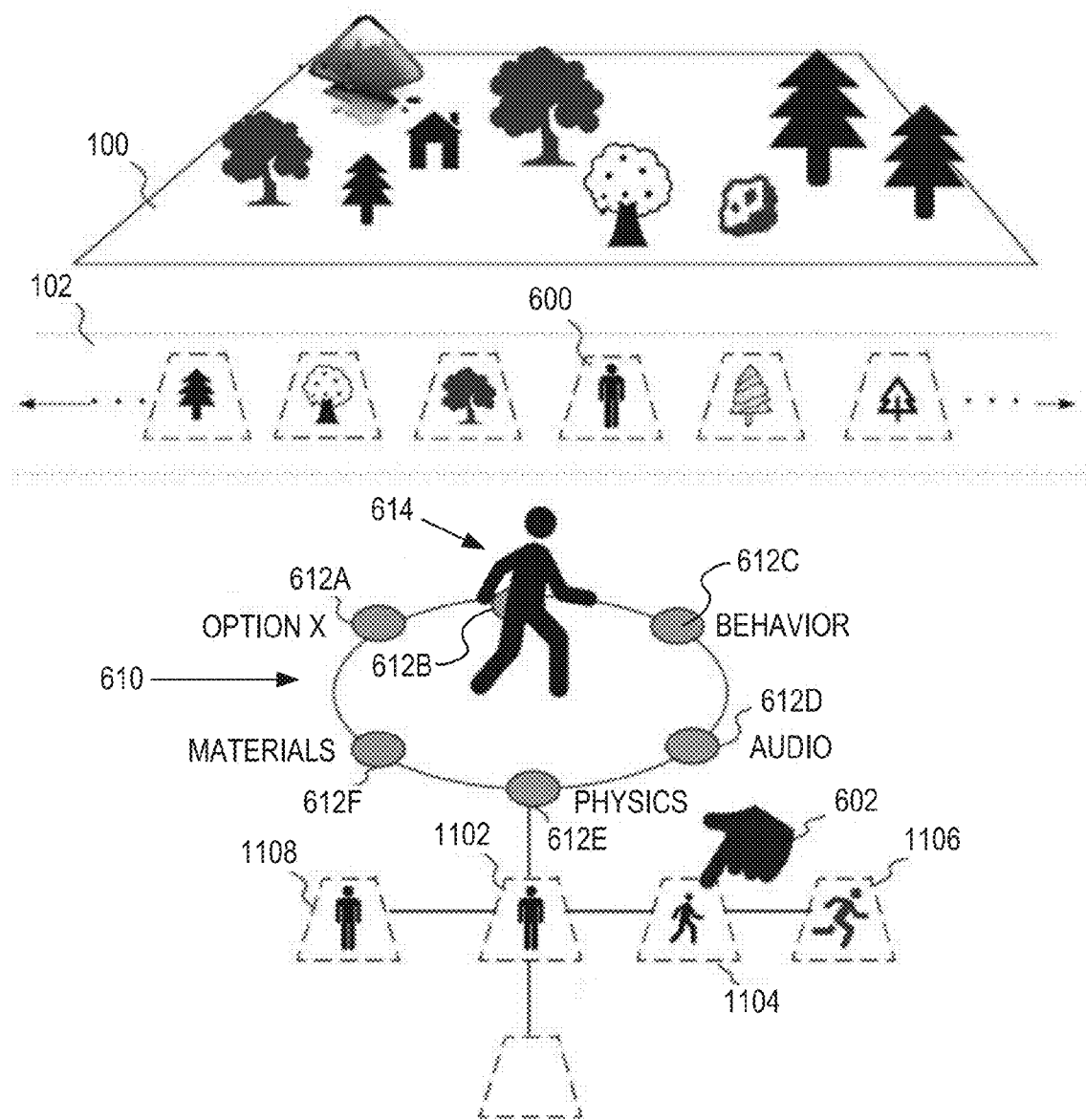
FIG. 11 illustrates the user interacting with one of the submenu items of the submenu (e.g., the Physics item) with the virtual hand.

FIG. 11 illustrates the user interacting with one of the submenu items 612 of the submenu 610 (e.g., the Physics item 612E) with the virtual hand 602. In the example embodiment, touching the Physics item 612E causes the VR editor engine 250 to display one or more options 1102 for the Physics item 612E selection (e.g., a deeper sub-menu). If the user further selects the option 1102, then other options become available, including walking 1104, running 1106, and standing still 1108. Selecting one of these options with the virtual hand 602 (or using another VR selection method) causes the 3D object 614 to demonstrate the associated behavior in real time. For example, selecting the walking behavior (e.g., option 1104) will cause the 3D object 614 to display a walking animation. Similarly, other submenu items 612 may cause various types of display changes to the 3D object 614.

In the example embodiment, this menu system 610 allows the user 200 to change or alter attributes or properties of the 3D object 614, as well as possibly witnessing the effects of the change immediately upon making them. For example, under Materials 612F, the user 200 may change the color and texture, or under Physics 612E, the user 200 may choose the type of inverse kinematics to apply to the 3D object 614, or whether it is using kinematic versus dynamic physical approaches. As such, the user 200 has access to, and ability to manipulate, multiple levels of attributes and properties associated with the 3D object 614, with the results previewed or displayed by the VR editor engine 250 on the central figure within the menu 610.

Figure 12B:
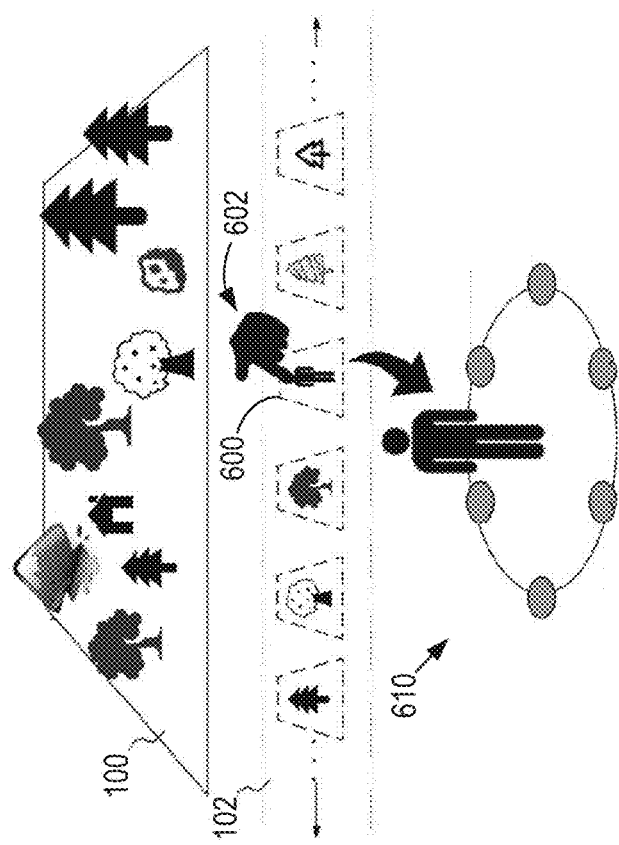
FIGS. 12A and 12B illustrate an example gesture mechanic (e.g., the pushing down of the card) performed by a real hand of the user in a real world environment relative to a real life object (e.g., a table), and the resulting actions displayed by the VR editor engine in the VR environment.
Figure 12A:
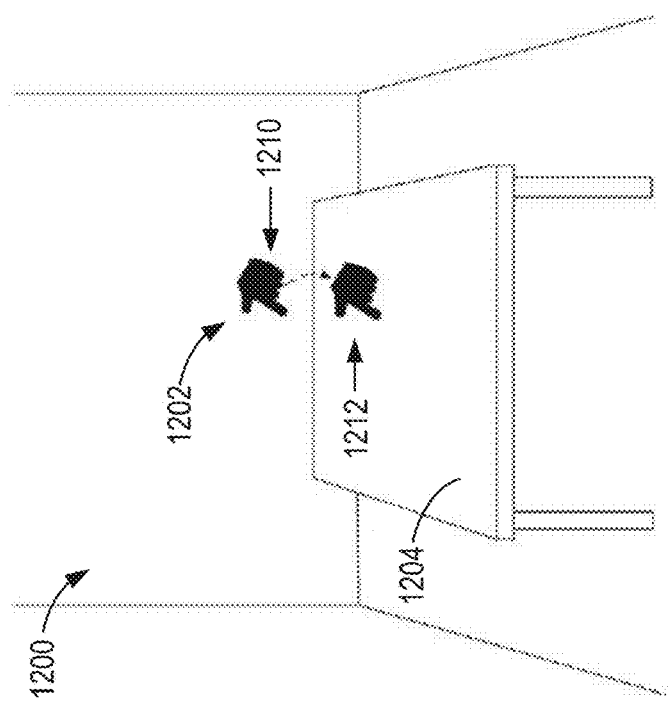

FIGS. 12A and 12B illustrate an example gesture mechanic (e.g., the pushing down of the card 400) performed by a real hand 1202 of the user 200 in a real world environment 1200 relative to a real life object (e.g., a table 1204), and the resulting actions displayed by the VR editor engine 250 in the VR environment 100. FIG. 12A illustrates the real world environment 1200, where FIG. 12B illustrates the corresponding virtual environment.

During operation, the user 200 may sit or stand near the table 1204 wearing the HMD 202, and may physically manipulate one or more wearable VR input devices (e.g., hand held motion trackers, not shown). FIG. 12A illustrates only a single real hand 1202 of the user 200 for ease of illustration. The right side of FIG. 12 illustrates the VR environment 100 as seen by the user 200 (e.g., via the HMD 202) as they perform an example gesture. In the example embodiment, the VR editor engine 250 uses infra-red sensors (not shown) to determine the location of the surface of the table 1212, which acts as a work surface for the VR editor engine 250. In other embodiments, the VR editor engine 250 performs a calibration routine using the VR input device(s) to determine the outlines, contours, and/or surface of the table 1204 (e.g., relative to the input devices).

In the example embodiment, the VR editor engine 250 displays the tray 102, and optionally the virtual environment 100, relative to the real world environment 1200, and floating in a region just above the surface of the table 1204. In other words, the tray 102 is oriented in the VR environment 100 relative to the input device(s) and the table 1204 such that the hand icon 602 "touches" the tray 102 at approximately spatially when the user 200's hand 1202 touches the table 1204. For example, the tray 102 may float an inch or two above the surface of the table 1204 (a "float distance" above the table 1204), and depressing a card 104 that float distance causes the card 600 to activate. As such, the tray 102 "occupies" or is otherwise associated with a real-world space on the table 1204 such that touching the table 1204, at particular points (e.g., in the real world environment 1200), correlates to touching the tray 102, or environment 100, at a particular virtual point within the virtual environment 100.

As the user 200 moves their real hand 1202, in the real world environment 1200, the movement is linked to the virtual hand 602 in the VR environment 100. The user 200 pushes their real hand 1202 from a first position 1210 (e.g., in the air) to a second position 1212 on the table 1204, thereby causing the virtual hand 602 to push down on the card 600. Upon detecting the push when the finger contacted the table 1204 in the real world environment 1200, the VR editor engine 250 reveals the submenu 610 in the VR environment 100. In other embodiments, the user may operate without a real world surface (e.g. in "open air", without the table 1204). The VR application 210 may reveal the submenu after the user pushes a card 600 down a minimum distance (e.g. a few inches).

As such, the presence and calibration of the table 1204 to the VR environment (e.g., the card tray 102) allows the user 200 to use their tactile and spatial senses when manipulating virtual objects adjacent to the table 1204, and may help some users 200 with physiological problems associated with VR. For example, such correlation between the real world environment 1200 and VR environment 100 may help users 200 with balance and orientation (e.g., knowing where their arms are relative to a real world object), or motion sickness (e.g., queasiness from detached vision), and so forth. Calibration of the surface of the table 1204 in the real world environment 1200 to the location of the card tray 102 in the VR environment 100 facilitates this benefit. In some embodiments, a virtual representation of the table 1204 may be presented in the VR environment 100, allowing additional benefits to the user 200, who could then "see" the location of the table 1204 within the VR environment as they "feel" the location of the table 1204 upon touching. In some embodiments, the VR environment 100 may instead be an augmented reality (AR) environment, with the card tray 102 calibrated to look as if it is sitting on or within the float distance of the surface of the table 1204.

Figure 13B:
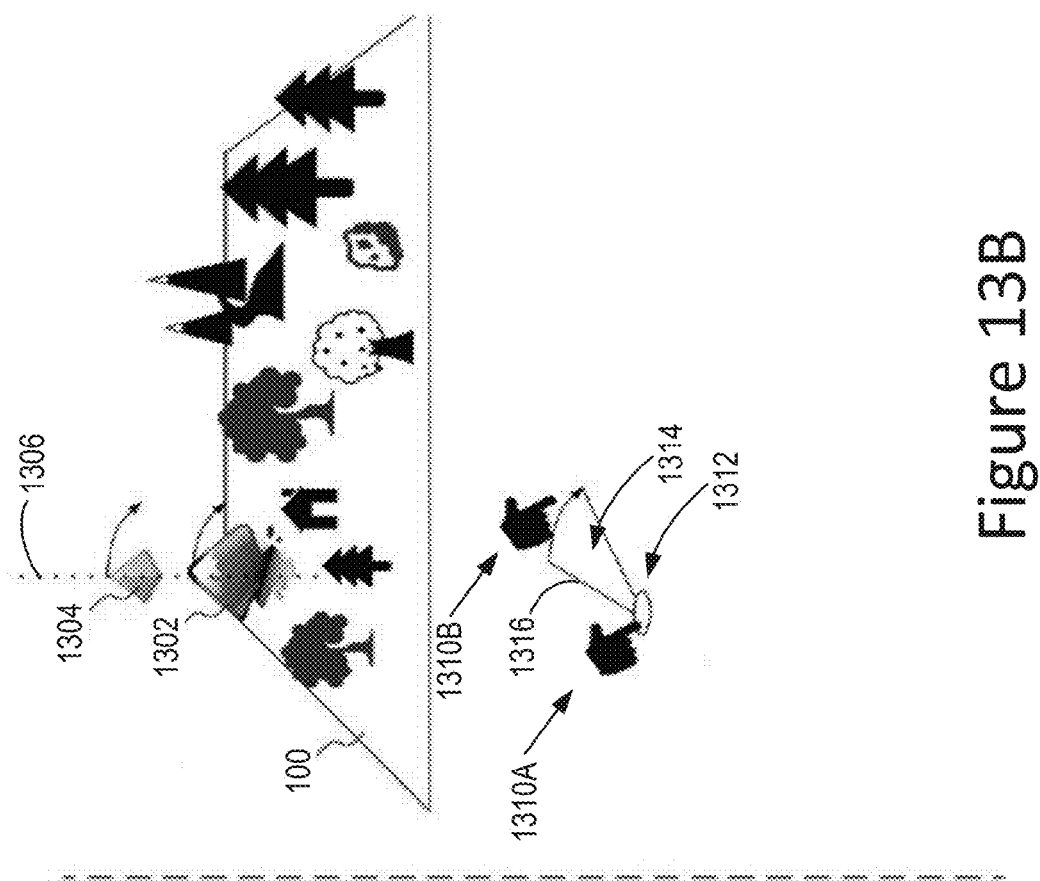
FIGS. 13A and 13B illustrate an example gesture mechanic for manipulating a target object (e.g., a mountain) within the virtual environment.
Figure 13A:
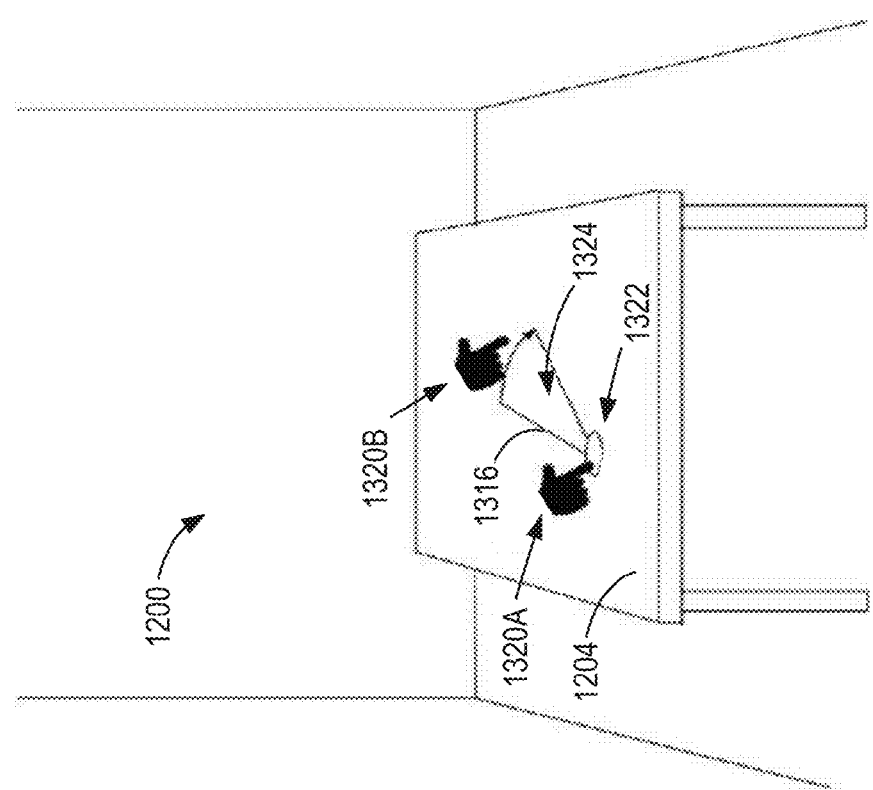

FIGS. 13A and 13B illustrate an example gesture mechanic for manipulating a target object (e.g., a mountain) 1302 within the virtual environment 102. FIG. 13A illustrates the real world actions of the user 200 performed in the real world environment 1200 using a first real hand 1320A and a second real hand 1320B (collectively, real hands 1320), and relative to a real life object (e.g., the table 1204). FIG. 13B illustrates the resulting actions displayed by the VR editor engine 250 in the VR environment 100, with a first virtual hand 1320A representing the first real hand 1320A and a second virtual hand 1320B representing the second real hand 1320B.

During operation, the user 200 wishes to manipulate the orientation of the mountain 1302. In the example embodiment, a pyramid shaped object (or just "pyramid") 1304 is displayed by the VR editor engine 250 above the mountain 1302 when the user 200 gazes, focuses, or otherwise selects the mountain 1302. The pyramid 1304 is oriented such that it shares an axis 1306 with the target object 1302. The pyramid 1304 is used to show and manipulate the orientation of the 3D object 1302 within the virtual environment 100.

In the example embodiment, the target object 1302 may be manipulated (e.g., rotated) by the user 200 via a series of real world hand gestures. The user wears a VR input device on each hand, and the VR editor engine 250 calibrates the real world table 1204 with the virtual environment 100 as described above with respect to FIGS. 12A and 12B. The gesture mechanic includes the user 200 placing or "anchoring" a first real finger from the first hand 1320A at a point 1322 on the table 1204 (referred to herein as a pivot point 1322). Upon sensing this touching of the table 1204 (e.g., based on the VR editor engine 250 detecting that the user 200 has touched a point on the table 1204), the VR editor engine 250 creates a pivot point 1312 in the virtual environment 100 for the virtual hand 1310A. The user 200 then places a second finger from the second hand 1320B on the table 1204 at a distance 1316 from the first finger (e.g., at a start point, not labeled) and drags the finger of the second hand 1320B in an arc 1324 around the first hand 1320A (e.g., ending at a second point, not labeled). As the user 200 performs these gestures in the real world environment 1200, the VR editor engine displays the virtual hands 1310 to mimic the action within the VR environment 100. Further, the VR editor engine 250 determines the amount of rotation 1314 (e.g., an angle, in degrees) of the second hand 1320B around the first hand 526, relative to the start and end points. As this angle increases, the VR editor engine rotates the target object 1302 and the pyramid 1304 in the VR environment 100 about the axis 1306 based on the amount of the rotation. In some embodiments, the VR editor engine 250 displays the amount of rotation (e.g. in degrees) to the user 200 in the VR environment 100 as the second finger from the second virtual hand 1310B rotates around the first finger from the first virtual hand 1310A.

Figure 14:
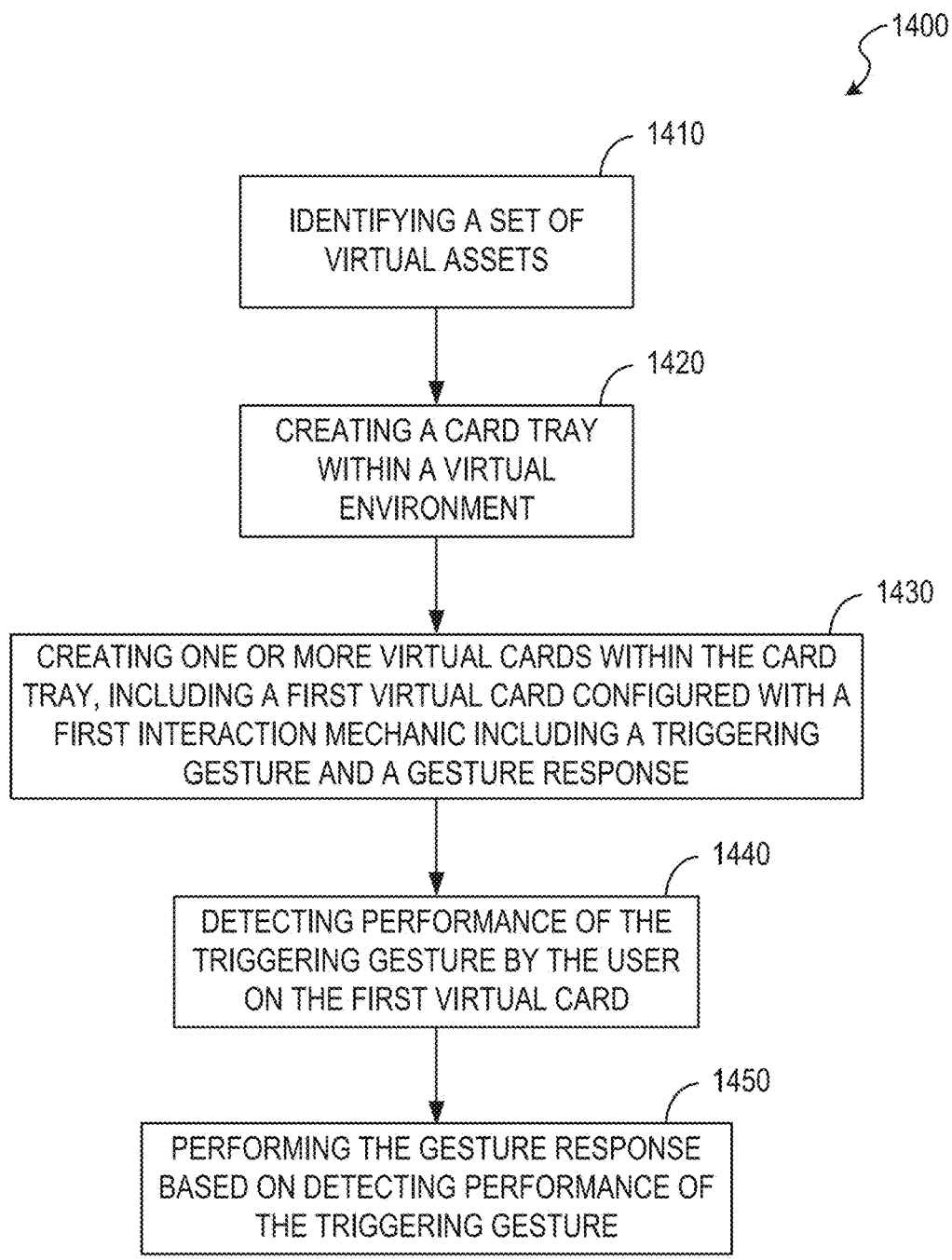
FIG. 14 is a flow chart of a computer-implemented method for providing a card tray in a virtual environment.

FIG. 14 is a flow chart of a computer-implemented method 1400 for providing a card tray in a virtual environment. In the example embodiment, the method 1400 is performed by a computing device comprising at least one processor, a memory, and a first hand-tracking input device. The method 1400 includes identifying a set of virtual assets, each virtual asset includes data associated with a 3D object (see operation 1410). The method 1400 also includes creating a card tray within a virtual environment, the card tray appearing within arms reach of a user, the virtual environment is displayed to the user via a head mounted display (HMD) worn by the user (see operation 1420).

The method 1400 further includes creating one or more virtual cards within the card tray, the one or more virtual cards including a first virtual card, the first virtual card is configured with a first interaction mechanic, the first interaction mechanic includes a triggering gesture and an associated gesture response, the triggering gesture allows the user to interact with the first virtual card within the virtual environment by performing the triggering gesture on the first virtual card (see operation 1430). The method 1400 also includes detecting performance of the triggering gesture by the user on the first virtual card using a first hand-tracking input device configured to track hand motion of a first hand of the user (see operation 1440). The method further includes performing the gesture response associated with the first interaction mechanic based on detecting performance of the triggering gesture (see operation 1450).

In some embodiments, each virtual card of the one or more virtual cards represents one or more virtual assets of the set of virtual assets, and the first virtual card is a category card associated with one or more virtual assets within an asset category, and the first interaction mechanic is a card expansion, and the triggering gesture is pressing the first virtual card down within the virtual environment, and the gesture response includes creating one or more additional virtual cards within the card tray, and each of the one or more additional virtual cards is associated with a virtual asset of the one or more virtual assets within the asset category. In some embodiments, the one or more additional virtual cards includes a second virtual card, and the second virtual card a second interaction mechanic, and the second interaction mechanic includes a second triggering gesture and an associated second gesture response, and the second triggering gesture is pressing the second virtual card up within the virtual environment, and the second gesture response includes removing the one or more additional virtual cards from the card tray. In other embodiments, the card tray is configured with a third interaction mechanic, and the third interaction mechanic includes a third triggering gesture and a third gesture response, and the third triggering gesture is grabbing the card tray within the virtual environment, and the third gesture response includes scrolling the one or more virtual cards within the card tray based on hand motion of the user.

In some embodiments, the card tray includes a scroll boundary, and the method 1400 further includes detecting, during the third triggering gesture, that an edge virtual card within card tray has reached the scroll boundary, and performing the second gesture response based on the detecting.

In some embodiments, the first interaction mechanic further identifies a first orientation, and the first orientation represents an orientation of the first hand of the user in which the triggering gesture is active, and the method further includes identifying a predetermined angle range associated with a first orientation of the first hand of the user, detecting a first angle of orientation of the first hand-tracking input device, and determining that the first angle of orientation is within the predetermined angle range associated with the first orientation, and detecting performance of the triggering gesture is further based on the determining that the first angle of orientation is within the predetermined angle range associated with the first orientation.

In some embodiments, the method further includes determining a spatial location of a real world surface near the user, and creating the card tray within the virtual environment further includes creating the card tray in the virtual environment within a predetermined distance of the real world surface.

In some embodiments, the first virtual card is associated with a first virtual asset of the set of virtual assets, and the triggering gesture is pressing the first virtual card down within the virtual environment, and the gesture response includes creating a virtual menu within the virtual environment, the virtual menu includes one or more virtual menu objects configured to alter properties of virtual asset.

Figure 15:
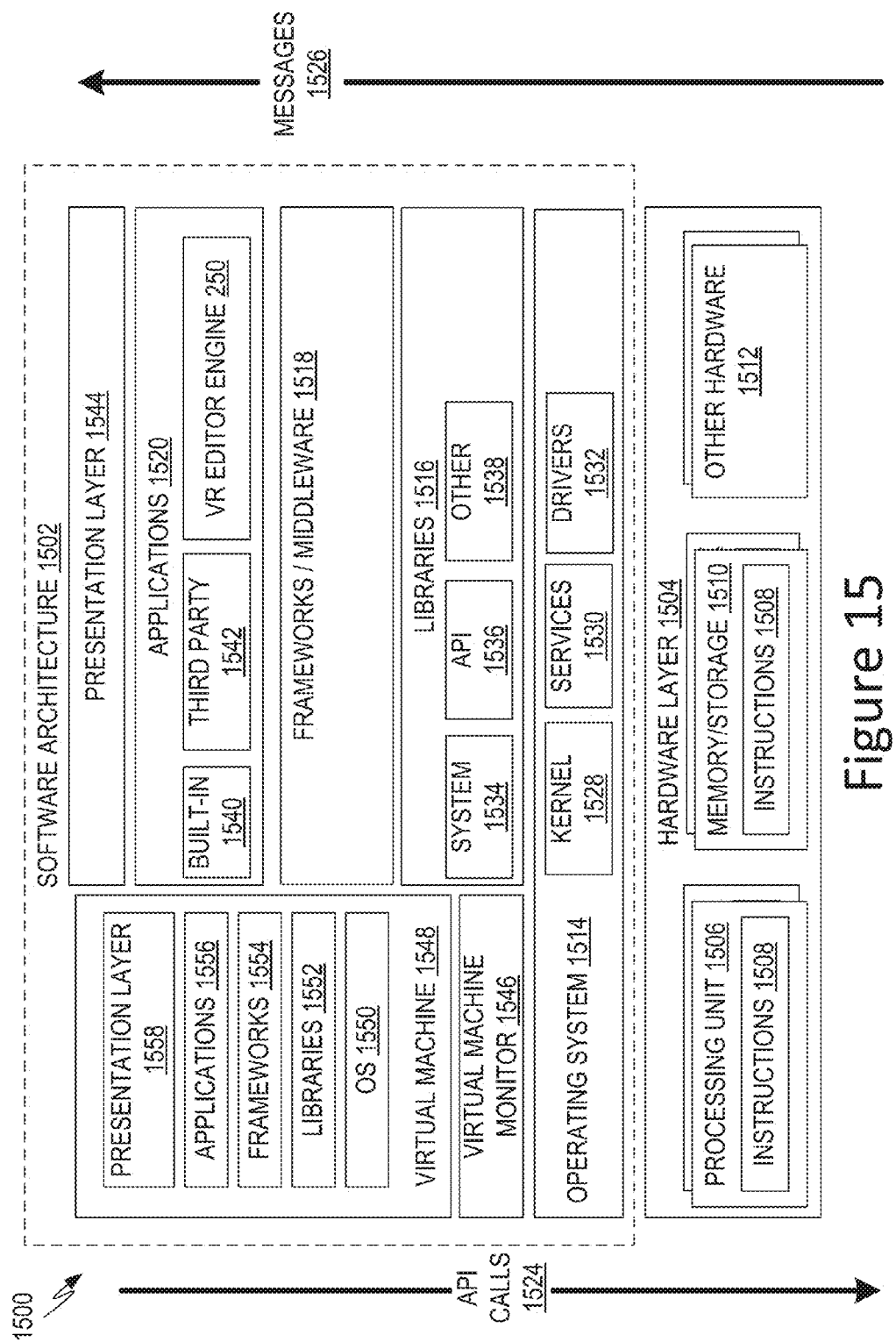
FIG. 15 is a block diagram illustrating an example software architecture, which may be used in conjunction with various hardware architectures herein described.

FIG. 15 is a block diagram illustrating an example software architecture 1502, which may be used in conjunction with various hardware architectures herein described. FIG. 15 is a non-limiting example of a software architecture and it will be appreciated that many other architectures may be implemented to facilitate the functionality described herein. The software architecture 1502 may execute on hardware such as machine 1600 of FIG. 16 that includes, among other things, processors 1610, memory 1630, and input/output (I/O) components 1650. A representative hardware layer 1504 is illustrated and can represent, for example, the a machine 1600 of FIG. 16. The representative hardware layer 1504 includes a processing unit 1506 having associated executable instructions 1508. The executable instructions 1508 represent the executable instructions of the software architecture 1502, including implementation of the methods, modules and so forth described herein. The hardware layer 1504 also includes memory and/or storage modules shown as memory/storage 1510, which also have the executable instructions 1508. The hardware layer 1504 may also comprise other hardware 1512.

In the example architecture of FIG. 15, the software architecture 1502 may be conceptualized as a stack of layers where each layer provides particular functionality. For example, the software architecture 1502 may include layers such as an operating system 1514, libraries 1516, frameworks or middleware 1518, applications 1520 and a presentation layer 1544. Operationally, the applications 1520 and/or other components within the layers may invoke application programming interface (API) calls 1524 through the software stack and receive a response as messages 1526. The layers illustrated are representative in nature and not all software architectures have all layers. For example, some mobile or special purpose operating systems may not provide the frameworks/middleware 1518, while others may provide such a layer. Other software architectures may include additional or different layers.

The operating system 1514 may manage hardware resources and provide common services. The operating system 1514 may include, for example, a kernel 1528, services 1530, and drivers 1532. The kernel 1528 may act as an abstraction layer between the hardware and the other software layers. For example, the kernel 1528 may be responsible for memory management, processor management (e.g., scheduling), component management, networking, security settings, and so on. The services 1530 may provide other common services for the other software layers. The drivers 1532 may be responsible for controlling or interfacing with the underlying hardware. For instance, the drivers 1532 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1516 may provide a common infrastructure that may be used by the applications 1520 and/or other components and/or layers. The libraries 1516 typically provide functionality that allows other software modules to perform tasks in an easier fashion than by interfacing directly with the underlying operating system 1514 functionality (e.g., kernel 1528, services 1530, and/or drivers 1532). The libraries 1516 may include system libraries 1534 (e.g., C standard library) that may provide functions such as memory allocation functions, string manipulation functions, mathematic functions, and the like. In addition, the libraries 1516 may include API libraries 1536 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1516 may also include a wide variety of other libraries 1538 to provide many other APIs to the applications 1520 and other software components/modules.

The frameworks 1518 (also sometimes referred to as middleware) provide a higher-level common infrastructure that may be used by the applications 1520 and/or other software components/modules. For example, the frameworks/middleware 1518 may provide various graphic user interface (GUI) functions, high-level resource management, high-level location services, and so forth. The frameworks/middleware 1518 may provide a broad spectrum of other APIs that may be used by the applications 1520 and/or other software components/modules, some of which may be specific to a particular operating system or platform.

The applications 1520 include built-in applications 1540 and/or third-party applications 1542. Examples of representative built-in applications 1540 may include, but are not limited to, a contacts application, a browser application, a book reader application, a location application, a media application, a messaging application, and/or a game application. The third-party applications 1542 may include an application developed using the Android™ or iOS™ software development kit (SDK) by an entity other than the vendor of the particular platform, and may be mobile software running on a mobile operating system such as iOS™, Android™, Windows@ Phone, or other mobile operating systems. The third-party applications 1542 may invoke the API calls 1524 provided by the mobile operating system such as the operating system 1514 to facilitate functionality described herein.

The applications 1520 may use built-in operating system functions (e.g., kernel 1528, services 1530, and/or drivers 1532), libraries 1516, or frameworks/middleware 1518 to create user interfaces to interact with users of the system. Alternatively, or additionally, in some systems interactions with a user may occur through a presentation layer, such as the presentation layer 1544. In these systems, the application/module "logic" can be separated from the aspects of the application/module that interact with a user.

Some software architectures use virtual machines. In the example of FIG. 15, this is illustrated by a virtual machine 1548. The virtual machine 1548 creates a software environment where applications/modules can execute as if they were executing on a hardware machine (such as the machine 1600 of FIG. 11, for example). The virtual machine 1548 is hosted by a host operating system (e.g., operating system 1514 in FIG. 10) and typically, although not always, has a virtual machine monitor 1546, which manages the operation of the virtual machine 1548 as well as the interface with the host operating system (e.g., operating system 1514). A software architecture executes within the virtual machine 1548 such as an operating system (OS) 1550, libraries 1552, frameworks 1554, applications 1556, and/or a presentation layer 1558. These layers of software architecture executing within the virtual machine 1548 can be the same as corresponding layers previously described or may be different.

Figure 16:
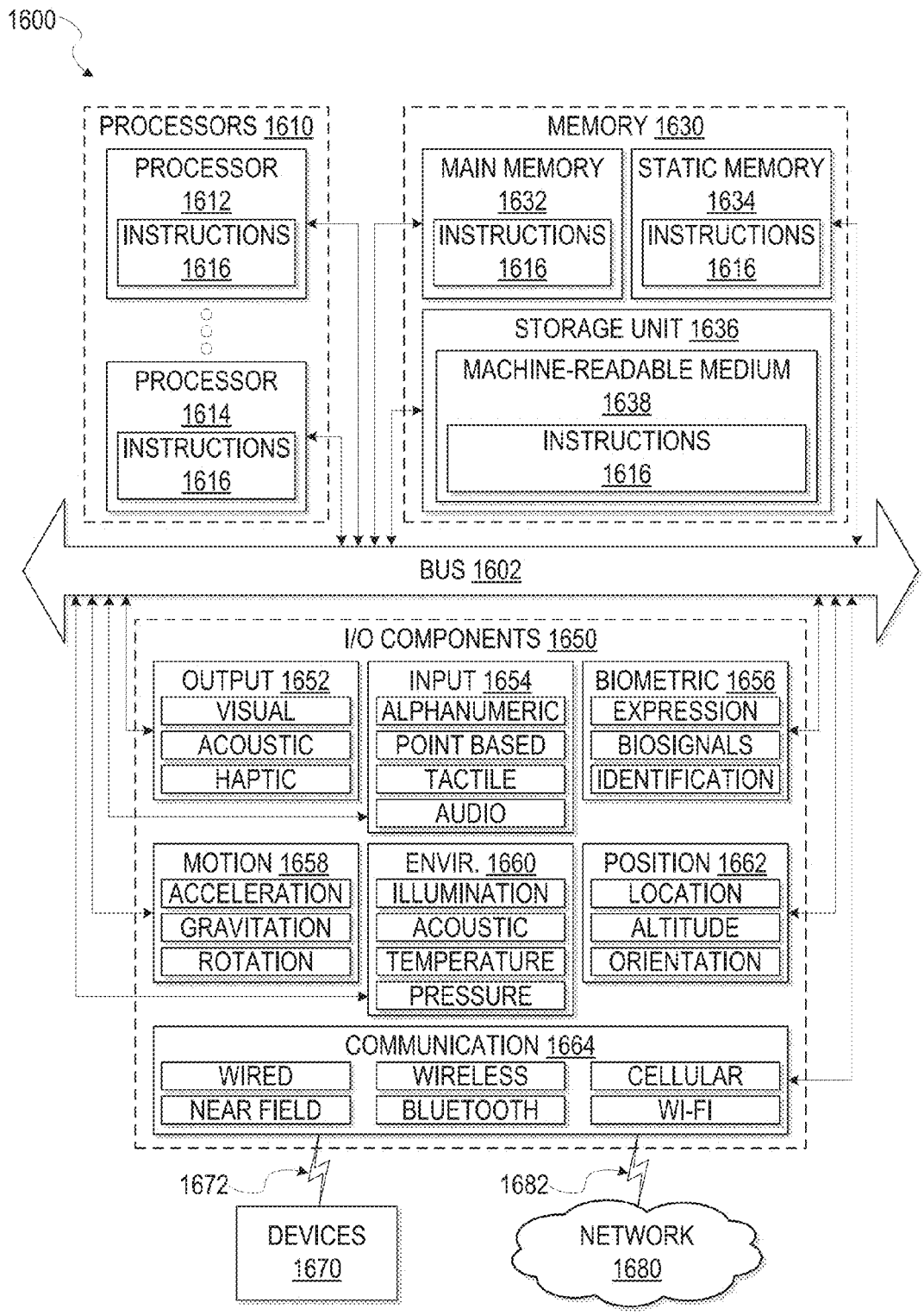
FIG. 16 is a block diagram illustrating components of a machine, according to some example embodiments, able to read instructions from a machine-readable medium (e.g., a machine-readable storage medium) and perform any one or more of the methodologies discussed herein.

FIG. 16 is a block diagram illustrating components of a machine 1600, according to some example embodiments, able to read instructions from a machine-readable medium (e.g., a machine-readable storage medium) and perform any one or more of the methodologies discussed herein. Specifically, FIG. 16 shows a diagrammatic representation of the machine 1600 in the example form of a computer system, within which instructions 1616 (e.g., software, a program, an application, an applet, an app, or other executable code) for causing the machine 1600 to perform any one or more of the methodologies discussed herein may be executed. As such, the instructions 1616 may be used to implement modules or components described herein. The instructions 1616 transform the general, non-programmed machine 1600 into a particular machine 1600 programmed to carry out the described and illustrated functions in the manner described. In alternative embodiments, the machine 1600 operates as a standalone device or may be coupled (e.g., networked) to other machines. In a networked deployment, the machine 1600 may operate in the capacity of a server machine or a client machine in a server-client network environment, or as a peer machine in a peer-to-peer (or distributed) network environment. The machine 1600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1616, sequentially or otherwise, that specify actions to be taken by the machine 1600. Further, while only a single machine 1600 is illustrated, the term "machine" shall also be taken to include a collection of machines that individually or jointly execute the instructions 1616 to perform any one or more of the methodologies discussed herein.

The machine 1600 may include processors 1610, memory 1630, and input/output (I/O) components 1650, which may be configured to communicate with each other such as via a bus 1602. In an example embodiment, the processors 1610 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1612 and a processor 1614 that may execute the instructions 1616. The term "processor" is intended to include multi-core processor that may comprise two or more independent processors (sometimes referred to as "cores") that may execute instructions contemporaneously. Although FIG. 16 shows multiple processors, the machine 1600 may include a single processor with a single core, a single processor with multiple cores (e.g., a multi-core processor), multiple processors with a single core, multiple processors with multiples cores, or any combination thereof.

The memory 1630 may include a memory, such as a main memory 1632, a static memory 1634, or other memory storage, and a storage unit 1636, both accessible to the processors 1610 such as via the bus 1602. The storage unit 1636 and memory 1632, 1634 store the instructions 1616 embodying any one or more of the methodologies or functions described herein. The instructions 1616 may also reside, completely or partially, within the memory 1632, 1634, within the storage unit 1636, within at least one of the processors 1610 (e.g., within the processor's cache memory), or any suitable combination thereof, during execution thereof by the machine 1600. Accordingly, the memory 1632, 1634, the storage unit 1636, and the memory of processors 1610 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 1616. The term "machine-readable medium" shall also be taken to include any medium, or combination of multiple media, that is capable of storing instructions (e.g., instructions 1616) for execution by a machine (e.g., machine 1600), such that the instructions, when executed by one or more processors of the machine 1600 (e.g., processors 1610), cause the machine 1600 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 1650 may include a wide variety of components to receive input, provide output, produce output, transmit information, exchange information, capture measurements, and so on. The specific input/output (I/O) components 1650 that are included in a particular machine will depend on the type of machine. For example, portable machines such as mobile phones will likely include a touch input device or other such input mechanisms, while a headless server machine will likely not include such a touch input device. It will be appreciated that the input/output (I/O) components 1650 may include many other components that are not shown in FIG. 16. The input/output (I/O) components 1650 are grouped according to functionality merely for simplifying the following discussion and the grouping is in no way limiting. In various example embodiments, the input/output (I/O) components 1650 may include output components 1652 and input components 1654. The output components 1652 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the input/output (I/O) components 1650 may include biometric components 1656, motion components 1658, environment components 1660, or position components 1662 among a wide array of other components. For example, the biometric components 1656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1658 may include acceleration sensor components (e.g., accelerometer), gravitation sensor components, rotation sensor components (e.g., gyroscope), and so forth. The environmental environment components 1660 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1662 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The input/output (I/O) components 1650 may include communication components 1664 operable to couple the machine 1600 to a network 1680 or devices 1670 via a coupling 1682 and a coupling 1672 respectively. For example, the communication components 1664 may include a network interface component or other suitable device to interface with the network 1680. In further examples, communication components 1540 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1670 may be another machine or any of a wide variety of peripheral devices (e.g., a peripheral device coupled via a Universal Serial Bus (USB)).

Moreover, the communication components 1664 may detect identifiers or include components operable to detect identifiers. For example, the communication components 1664 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1664, such as location via Internet Protocol (IP) geolocation, location via Wi-Fi® signal triangulation, location via detecting an NFC beacon signal that may indicate a particular location, and so forth.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
one or more hardware processors;
a head mounted display (HMD) configured to display a virtual environment and a floating virtual card tray within the virtual environment to a user wearing the HMD;
a first hand-tracking input device configured to track hand motion of a first hand of the user; and
an editor engine, executable by the one or more hardware processors, configured to perform operations for editing the virtual environment, the operations comprising:
identifying a set of virtual assets, each virtual asset including data associated with a 3D virtual object that is placeable at locations in a region within the virtual environment;
creating the floating virtual card tray to be displayed within the virtual environment, the floating virtual card tray appearing between the region and the user, being within arm's reach of the user, and appearing at a predefined float distance apart from a real-world surface:
creating one or more virtual cards within the floating virtual card tray, each virtual card of the one or more virtual cards associated with a virtual asset of the set of virtual assets, the one or more virtual cards including a first virtual card, the first virtual card configured with a first interaction mechanic, the first interaction mechanic including a triggering gesture and an associated gesture response, the triggering gesture allowing the user to interact with the first virtual card within the virtual environment by performing the triggering gesture on the first virtual card, the triggering gesture including depressing the first virtual card by the float distance;
detecting performance of the triggering gesture by the user on the first virtual card using the first hand-tracking input device; and
based on detecting performance of the triggering gesture, performing the gesture response associated with the first interaction mechanic, the gesture response facilitating the editing of the virtual environment.

2. The system of claim 1, wherein the first virtual card is a category card associated with one or more virtual assets within an asset category, the first interaction mechanic is a card expansion, the triggering gesture is pressing the first virtual card down within the virtual environment by the float distance, the gesture response includes creating one or more additional virtual cards within the floating virtual card tray, each of the one or more additional virtual cards associated with a virtual asset of the one or more virtual assets within the asset category.

3. The system of claim 2, wherein the one or more additional virtual cards includes a second virtual card, the second virtual card and a second interaction mechanic, the second interaction mechanic including a second triggering gesture and an associated second gesture response, the second triggering gesture including pressing the second virtual card up within the virtual environment, the second gesture response including removing the one or more additional virtual cards from the floating virtual card tray.

4. The system of claim 3, wherein the floating virtual card tray is configured with a third interaction mechanic, the third interaction mechanic including a third triggering gesture and a third gesture response, the third triggering gesture including grabbing the floating virtual card tray within the virtual environment, the third gesture response including scrolling the one or more virtual cards within the floating virtual card tray based on the hand motion of the user.

5. The system of claim 4, wherein the floating virtual card tray includes a scroll boundary, the operations further comprising:
   detecting, during the third triggering gesture, that an edge of one of the virtual cards within floating virtual card tray has reached the scroll boundary; and
   performing the second gesture response based on the detecting.

6. The system of claim 1, wherein the first interaction mechanic further identifies a first orientation, the first orientation representing an orientation of the first hand of the user in which the triggering gesture is active, the operations further comprising:
   identifying a predetermined angle range associated with the first orientation of the first hand of the user;
   detecting a first angle of orientation of the first hand-tracking, input device; and
   determining that the first angle of orientation is within the predetermined angle range associated with the first orientation, wherein detecting performance of the triggering gesture is further based on the determining that the first angle of orientation is within the predetermined angle range associated with the first orientation.

7. The system of claim 1, wherein the first virtual card is associated with a first virtual asset of the set of virtual assets, wherein the gesture response includes creating a virtual menu within the virtual environment, the virtual menu including one or more virtual menu objects configured to alter a property of a first 3D virtual object associated with the first virtual asset.

8. The system of claim 7, wherein the property is one of options, controls, behavior, audio, physics, or materials associated with the 3D virtual object.

9. The system of claim 7, wherein the gesture response allows the user to place the first virtual card at a location in the virtual environment, and wherein the placing of the first virtual card creates an instance of the 3D virtual object at the location in the virtual environment.

10. The system of claim 7, wherein the triggering gestures is restricted to a palm down orientation state and the depressing of the card by the float distance is based on a determination that the hand motion was performed in the palm down orientation state.

11. A computer-implemented method of editing a virtual environment comprising:
   identifying a set of virtual assets, each virtual asset including data associated with a 3D virtual object that is placeable at locations within a within a region of the virtual environment;
   creating a floating virtual card tray to be displayed within the virtual environment, the floating virtual card tray appearing between the region and the user, being within arm's reach of a user, and appearing in a region that is a predefined float distance apart from a real-world surface, the virtual environment displayed to the user via a head mounted display (HMD) worn by the user;
   creating one or more virtual cards within the floating virtual card tray, each virtual card of the one or more virtual cards associated with a virtual asset of the set of virtual assets, the one or more virtual cards including a first virtual card, the first virtual card configured with a first interaction mechanic, the first interaction mechanic including a triggering gesture and an associated gesture response, the triggering gesture allowing the user to interact with the first virtual card within the virtual environment by performing the triggering gesture on the first virtual card, the triggering gesture including depressing the first virtual card by the float distance;
   detecting performance of the triggering gesture by the user on the first virtual card using a first hand-tracking input device configured to track hand motion of a first hand of the user; and
   based on detecting performance of the triggering gesture, performing the gesture response associated with the first interaction mechanic, the gesture response facilitating the editing of the virtual environment.

12. The method of claim 11, wherein the first virtual card is a category card associated with one or more virtual assets within an asset category, the first interaction mechanic is a card expansion, the triggering gesture is pressing the first virtual card down within the virtual environment by the float distance, the gesture response includes creating one or more additional virtual cards within the floating virtual card tray, each of the one or more additional virtual cards associated with a virtual asset of the one or more virtual assets within the asset category.

13. The method of claim 12, wherein the one or more additional virtual cards includes a second virtual card, the second virtual card and a second interaction mechanic, the second interaction mechanic including a second triggering gesture and an associated second gesture response, the second triggering gesture including pressing the second virtual card up within the virtual environment, the second gesture response including removing the one or more additional virtual cards from the floating virtual card tray.

14. The method of claim 13, wherein the floating virtual card tray is configured with a third interaction mechanic, the third interaction mechanic including a third triggering gesture and a third gesture response, the third triggering gesture including grabbing the floating virtual card tray within the virtual environment, the third gesture response includes scrolling the one or more virtual cards within the floating virtual card tray based on hand motion of the user.

15. The method of claim 14, wherein the floating virtual card tray includes a scroll boundary, the method further comprising:
   detecting, during the third triggering gesture, that an edge of one of the virtual cards within floating virtual card tray has reached the scroll boundary; and
   performing the second gesture response based on the detecting.

16. The method of claim 11, wherein the first interaction mechanic further identifies a first orientation, the first orientation representing an orientation of the first hand of the user in which the triggering gesture is active, the method further comprising:
   identifying a predetermined angle range associated with a first orientation of the first hand of the user;
   detecting a first angle of orientation of the first hand-tracking input device; and
   determining that the first angle of orientation is within the predetermined angle range associated with the first orientation, wherein detecting performance of the triggering gesture is further based on the determining that the first angle of orientation is within the predetermined angle range associated with the first orientation.

17. The method of claim 11, wherein the first virtual card is associated with a first virtual asset of the set of virtual assets, wherein the gesture response includes creating a virtual menu within the virtual environment, the virtual menu including one or more virtual menu objects configured to alter a property of a first 3D virtual object associated with the first virtual asset.

18. A non-transitory machine-readable medium storing processor-executable instructions which, when executed by one or more processors, cause the one or more processors to perform operations for editing a virtual environment, the operations comprising:
   identifying a set of virtual assets, each virtual asset including data associated with a 3D virtual object that is placeable within the virtual environment;
   creating a floating virtual card tray to be displayed alongside the virtual environment, the floating virtual card tray appearing between the virtual environment and the user and being within a calibrated arm's reach of a user, the virtual environment is displayed to the user via a head mounted display (HMD) worn by the user, the floating virtual card tray appearing in a region that is a predefined float distance apart from a real-world surface;
   creating one or more virtual cards within the floating virtual card tray, each virtual card of the one or more virtual cards associated with a virtual asset of the set of virtual assets, the one or more virtual cards including a first virtual card, the first virtual card configured with a first interaction mechanic, the first interaction mechanic including a triggering gesture and an associated gesture response, the triggering gesture allowing the user to interact with the first virtual card within the virtual environment by performing the triggering gesture on the first virtual card, the triggering gesture including depressing the first virtual card by the float distance;
   detect performance of the triggering gesture by the user on the first virtual card using a first hand-tracking input device configured to track hand motion of a first hand of the user; and
   based on detecting performance of the triggering gesture, perform the gesture response associated with the first interaction mechanic, the gesture response facilitating the editing of the virtual environment.

19. The non-transitory machine-readable medium of claim 18, wherein the first virtual card is a category card associated with one or more virtual assets within an asset category, the first interaction mechanic is a card expansion, the triggering gesture is pressing the first virtual card down within the virtual environment by the float distance, the gesture response includes creating one or more additional virtual cards within the floating virtual card tray, each of the one or more additional virtual cards associated with a virtual asset of the one or more virtual assets within the asset category.

20. The non-transitory machine-readable medium of claim 19, wherein the one or more additional virtual cards includes a second virtual card, the second virtual card and a second interaction mechanic, the second interaction mechanic including a second triggering gesture and an associated second gesture response, the second triggering gesture is pressing the second virtual card up within the virtual environment, the second gesture response including removing the one or more additional virtual cards from the floating virtual card tray.

21. The non-transitory machine-readable medium of claim 20, wherein the floating virtual card tray is configured with a third interaction mechanic, the third interaction mechanic including a third triggering gesture and a third gesture response, the third triggering gesture including grabbing the floating virtual card tray within the virtual environment, the third gesture response including scrolling the one or more virtual cards within the floating virtual card tray based on hand motion of the user.

22. The non-transitory machine-readable medium of claim 21, wherein the floating virtual card tray includes a scroll boundary, the operations further comprising:
   detecting, during the third triggering gesture, that an edge of one of the virtual cards within floating virtual card tray has reached the scroll boundary; and
   perform the second gesture response based on the detecting.

23. The non-transitory machine-readable medium of claim 19, wherein the first interaction mechanic further identifies a first orientation, the first orientation representing an orientation of the first hand of the user in which the triggering gesture is active, the operations further comprising:
   identifying a predetermined angle range associated with the first orientation of the first hand of the user;
   detecting a first angle of orientation of the first hand-tracking input device; and
   determining that the first angle of orientation is within the predetermined angle range associated with the first orientation, wherein detecting performance of the triggering gesture is further based on the determining that the first angle of orientation is within the predetermined angle range associated with the first orientation.

24. The non-transitory machine-readable medium of claim 19, wherein the first virtual card is associated with a first virtual asset of the set of virtual assets, wherein the gesture response includes creating a virtual menu within the virtual environment, the virtual menu including one or more virtual menu objects configured to alter a property of a first 3D virtual object associated with the first virtual asset.

* * * * *

UNITED STATES PATENT AND TRADEMARK OFFICE
CERTIFICATE OF CORRECTION

PATENT NO. : 10,067,636 B2
APPLICATION NO. : 15/428966
DATED : September 4, 2018
INVENTOR(S) : Gregory Lionel Xavier Jean Palmaro It is certified that error appears in the above-identified patent and that said Letters Patent is hereby corrected as shown below:

In Column 20, Line 30, in Claim 1, delete "surface:" and insert --surface;-- therefor In Column 21, Lines 27-28, in Claim 6, delete "hand-tracking," and insert --hand-tracking-- therefor In Column 21, Line 59, in Claim 11, delete "within a within a" and insert --within a-- therefor Signed and Sealed this
Second Day of March, 2021

Drew Hirshfeld
*Performing the Functions and Duties of the*
*Under Secretary of Commerce for Intellectual Property and*
*Director of the United States Patent and Trademark Office*